(12) United States Patent
Hosny et al.

(10) Patent No.: US 7,059,820 B2
(45) Date of Patent: Jun. 13, 2006

(54) NOISE CONTROL

(75) Inventors: Diaa Hosny, Palos Verdes Estates, CA (US); Samir S. Ahmad, Rancho Palos Verdes, CA (US)

(73) Assignee: Honeywell International, Inc., Morristown, NJ (US)

( * ) Notice: Subject to any disclaimer, the term of this patent is extended or adjusted under 35 U.S.C. 154(b) by 539 days.

(21) Appl. No.: 10/199,790

(22) Filed: Jul. 19, 2002

(65) Prior Publication Data

US 2004/0011340 A1    Jan. 22, 2004

(51) Int. Cl.
*F01D 19/00* (2006.01)

(52) U.S. Cl. .............................. 415/1; 415/10; 415/13; 415/17; 415/26; 415/30; 415/119; 60/602

(58) Field of Classification Search ................ 415/1, 415/10, 13, 17, 26, 30, 47, 119; 60/602; 181/206, 207, 224; 381/71.1–71.14; 123/198 E
See application file for complete search history.

(56) References Cited

U.S. PATENT DOCUMENTS

| | | | | |
|---|---|---|---|---|
| 4,044,203 A | * | 8/1977 | Swinbanks | ................. 381/71.5 |
| 4,122,303 A | * | 10/1978 | Chaplin et al. | ............. 381/71.8 |
| 4,743,161 A | | 5/1988 | Fisher et al. | |
| 5,246,335 A | | 9/1993 | Mitsubori et al. | |
| 5,295,785 A | | 3/1994 | Church et al. | |
| 5,336,856 A | | 8/1994 | Krider et al. | |
| 5,399,064 A | | 3/1995 | Church et al. | |
| 5,478,199 A | * | 12/1995 | Gliebe | ......................... 415/119 |
| 5,498,127 A | * | 3/1996 | Kraft et al. | ................. 415/119 |
| 5,636,287 A | * | 6/1997 | Kubli et al. | ............... 381/71.2 |
| 5,702,230 A | * | 12/1997 | Kraft et al. | ................. 415/119 |
| 5,748,749 A | | 5/1998 | Miller et al. | |
| 5,919,029 A | * | 7/1999 | Van Nostrand et al. | ..... 415/119 |
| 6,188,770 B1 | | 2/2001 | Okada | |
| 6,394,655 B1 | | 5/2002 | Schnur et al. | |

FOREIGN PATENT DOCUMENTS

| | | |
|---|---|---|
| DE | 4212653 A1 | 10/1992 |
| DE | 19945653 | 9/1998 |
| DE | 19727139 A1 * | 1/1999 |
| EP | 0913585 A1 | 5/1999 |
| GB | 2256460 A | 12/1992 |

* cited by examiner

*Primary Examiner*—Christopher Verdier
(74) *Attorney, Agent, or Firm*—Chris James

(57) ABSTRACT

Methods, devices, and/or systems for controlling vibration and/or acoustic noise. An exemplary method senses noise and/or, for example, rotational speed of a rotating shaft, determines control parameters and actuates one or more actuators. An exemplary device includes a controller configured to receive information, determine control parameters and actuate one or more actuators. An exemplary system includes one or more sensors, a processor and one or more actuators. Various exemplary methods, devices, and/or systems are optionally suitable for use with turbochargers and/or other boost systems.

10 Claims, 20 Drawing Sheets

EXEMPLARY TURBOCHARGER

NOISE CONTROL

TECHNICAL FIELD

This invention relates generally to methods, devices, and/or systems for controlling noise in, for example, turbocharged and/or supercharged engines.

BACKGROUND

A boosted air system (e.g., turbocharger, supercharger, etc.), as applied to an internal combustion engine, typically introduces noise. For example, a turbocharger's compressor and/or turbine blades may generate whining noises and/or lower frequency rumble. Such disturbances may decrease longevity of a boosted air system and/or other components. In addition, Such disturbances may subjectively annoy people and/or animals in proximity to an operating boosted air system.

In general, noise Occurs as a result of component vibrations and/or aerodynamics (e.g., acoustics). Noise associated with component vibrations may originate from various sources such as bearings. For example, bearings can experience instabilities known as "whirl", which may depend on a variety of parameters Such as oil pressure, viscosity, and bearing geometry. In particular, journal bearings, which are used often in turbochargers, have one or more oil layers that separate a rotating shaft (or journal) and a fixed housing. Such a bearing geometry has proven susceptible to subsynchronous whirl having large amplitude vibrations between the journal and the housing. Large amplitude vibrations may induce fatigue and reduce considerably component longevity.

Acoustic noise stems from changes in pressure generated, for example, by component vibration and/or aerodynamics. Pressure fluctuations associated with acoustic noise generally travel as longitudinal waves, through air and/or other media. Characteristics of acoustic noise may change abruptly at interfaces between media due to differences in impedance. Of course, a variety of other parameters may determine characteristics of acoustic noise as well.

In vibration noise and/or acoustic noise, frequency normally depends on the number of vibrations or pressure fluctuations over time and noise often contains a large mixture of frequencies at a variety of amplitude levels. As described in more detail below, knowledge of frequency and/or amplitude of noise aids in active control of such noise.

BRIEF DESCRIPTION OF THE DRAWINGS

A more complete understanding of the various method, systems and/or arrangements described herein, and equivalents thereof, may be had by reference to the following detailed description when taken in conjunction with the accompanying drawings wherein.

DETAILED DESCRIPTION

Figure 1:
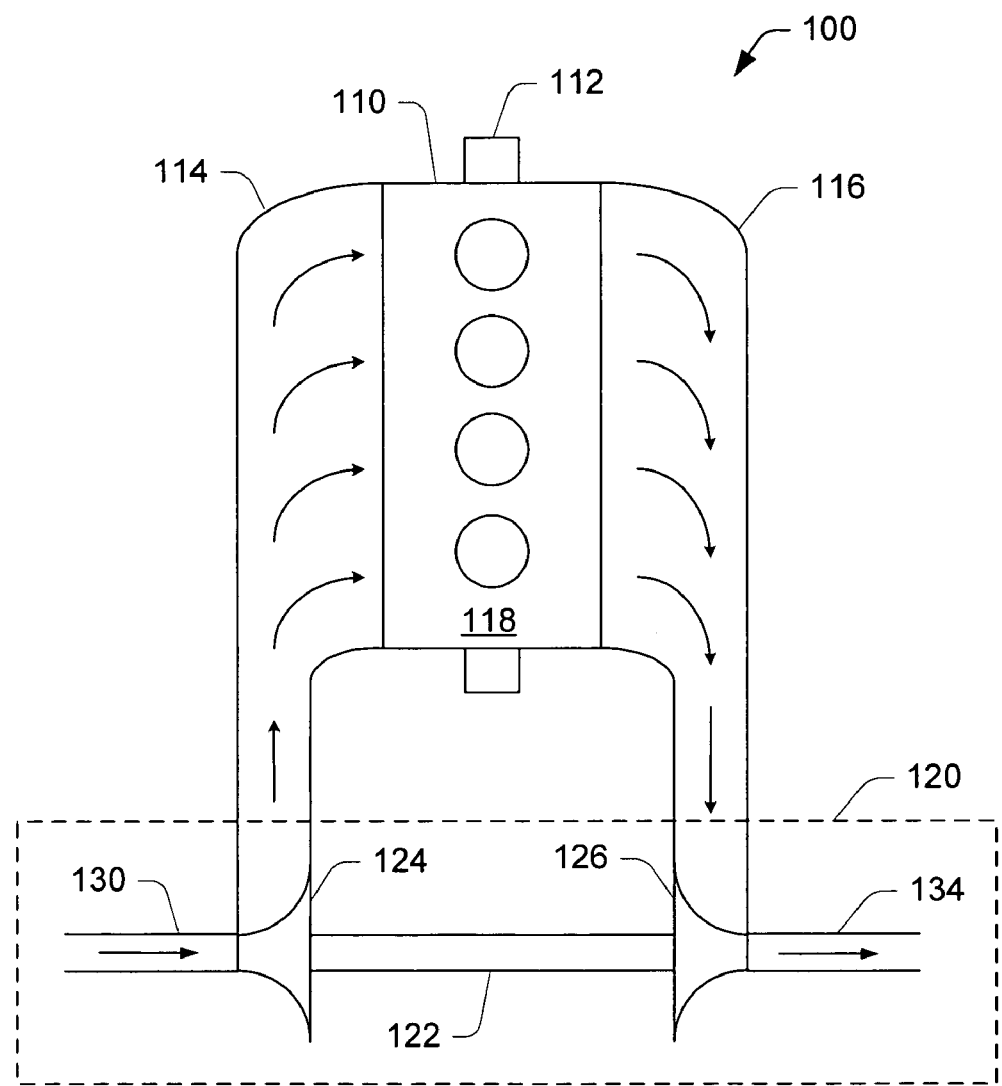
FIG. 1 is a simplified approximate diagram illustrating a turbocharger and an internal combustion engine.

Various exemplary systems and/or methods disclosed herein address issues related to noise. For example, as described in more detail below, various exemplary systems and/or methods address vibration and/or acoustic noise using sensors and/or actuators. Actuators suitable for use in vibration and/or acoustic noise control systems and/or methods typically include, but are hot limited to, piezoelectric actuators and/or other actuators capable of generating pressure waveforms. Further, sensors suitable for use in vibration and/or acoustic noise control systems and/or methods typically include, but are not limited to, piezoelectric sensors and/or other sensors capable of sensing pressure waveforms (e.g., stress, strain, displacement, etc. waveforms). Acoustic actuators and/or sensors optionally operate and/or sense frequencies in the range of approximately 600 Hz to approximately 2500 Hz. Vibration actuators and/or sensors optionally operate and/or sense frequencies in the range of approximately 1000 Hz (e.g., 60,000 rpm) to approximately 4000 Hz (e.g., 240,000 rpm). Actuators and/or sensors are optionally positioned on a wall of housing (e.g., of intake system, exhaust system, etc.) to avoid contact with and/or disturbance of gas and/or other fluid. Of course, other positions are possible as well, including internal to intake and/or exhaust where compatibility exists (e.g., environmental, flow, etc.).

Various exemplary systems and/or methods discussed herein optionally use actuators to apply force to a rotating shaft to reduce and/or otherwise damp vibration. Such exemplary actuators apply force either directly and/or indirectly to a rotating shaft and/or any component attached thereto. Exemplary actuators and/or sensors optionally operate to effectuate control in two or more degrees of freedom (e.g., arranged orthogonally in a plane defined by a bearing and/or other component). Exemplary sensors optionally include accelerometers and/or other sensors that may sense information related to frequency, phase and/or amplitude (and/or magnitude) of vibration and/or acoustic noise.

According to various exemplary systems and/or methods, actuators and/or sensors optionally communicate and/or work in a coordinated fashion (e.g., actuator-to/from-actuator, sensor-to/from-senor, and/or actuator-to/from-sensor). A controller or the like optionally facilitates such communication. Further, an exemplary system and/or method optionally senses and/or determines temperature and/or other operating parameters germane to proper operation of actuators and/or sensors.

Various exemplary systems and/or methods disclosed herein optionally address turbulence problems associated with intake and/or exhaust from an internal combustion engine. For example, an actuator directed at reduction of acoustic noise can smooth flow of combustion gas through an intake system. Indeed, such exemplary systems and/or methods are optionally applied to equipment (e.g., an internal combustion engine) relying on intake of combustion gas and not having a turbocharger and/or supercharger.

Various exemplary systems and/or methods disclosed herein optionally enhance combustion in an internal combustion engine. For example, an actuator directed at reduction of acoustic noise can smooth flow of combustion gas through an intake system and/or promote enhances mixing of combustion gas with another fuel (e.g., hydrogen, propane, diesel, gasoline, etc.).

Various exemplary systems and/or methods discussed herein optionally include learning systems, wherein information sensed and/or otherwise input is used to improve control over time, and/or adaptive control logic, wherein a model is used to predict behavior and/or control responsive to behavior.

Turning to the drawings, wherein like reference numerals refer to like elements, various methods are illustrated as being implemented in a suitable control and/or computing environment. Although not required, various exemplary methods are described in the general context of computer-executable instructions, such as program modules, being executed by a computer and/or other computing device. Generally, program modules include routines, programs, objects, components, data structures, etc., that perform particular tasks and/or implement particular abstract data types.

In some diagrams herein, various algorithmic acts are summarized in individual "blocks". Such blocks describe specific actions or decisions that are made or carried out as a process proceeds. Where a microcontroller (or equivalent) is employed, the flow charts presented herein provide a basis for a "control program" or software/firmware that may be used by such a microcontroller (or equivalent) to effectuate the desired control. As such, the processes are implemented as machine-readable instructions storable in memory that, when executed by a processor, perform the various acts illustrated as blocks. In addition, various diagrams include individual "blocks" that are optionally structural elements of a device and/or a system. For example, a "controller block" optionally includes a controller as a structural element, a "sensor block" optionally includes a sensor as a structural element, an "actuator block" optionally includes an actuator as a structural element, a "turbocharger block" optionally includes a turbocharger as a structural element, etc. In various blocks, structure and function are implied. For example, a controller block optionally includes a controller (e.g., a structure) for controlling noise (e.g., a function).

Those skilled in the art may readily write such a control program based on the flow charts and other descriptions presented herein. It is to be understood and appreciated that the subject matter described herein includes not only devices and/or systems when programmed to perform the acts described below, but the software that is configured to program the microcontrollers and, additionally, any and all computer-readable media on which such software might be embodied. Examples of such computer-readable media include, without limitation, floppy disks, hard disks, CDs, RAM, ROM, flash memory and the like.

Turbochargers are frequently utilized to increase the output of an internal combustion engine. Referring to FIG. 1, an exemplary system 100, including an exemplary internal combustion engine 110 and an exemplary turbocharger 120, is shown. The internal combustion engine 110 includes an engine block 118 housing one or more combustion chambers that operatively drive a shaft 112. As shown in FIG. 1, an intake port 114 provides a flow path for combustion gas (e.g., air) to the engine block while an exhaust port 116 provides a flow path for exhaust from the engine block 118.

The exemplary turbocharger 120 acts to extract energy from the exhaust and to provide energy to the combustion gas. As shown in FIG. 1, the turbocharger 120 includes a combustion gas inlet 130, a shaft 122 having a compressor 124, a turbine 126 and an exhaust outlet 134. Exhaust from the engine 110 diverted to the turbine 126 causes the shaft 122 to rotate, which, in turn, rotates the compressor 124. When rotating, the compressor 124 energizes combustion gas (e.g., ambient air) to produces a "boost" in combustion gas pressure (e.g., force per unit area or energy per unit Volume), Which is commonly referred to as "boost pressure." In this manner, a turbocharger may help to provide a larger mass of combustion gas (typically mixed with a carbon based and/or hydrogen-based fuel) to the engine, which translates to greater engine output during combustion.

Figure 2:
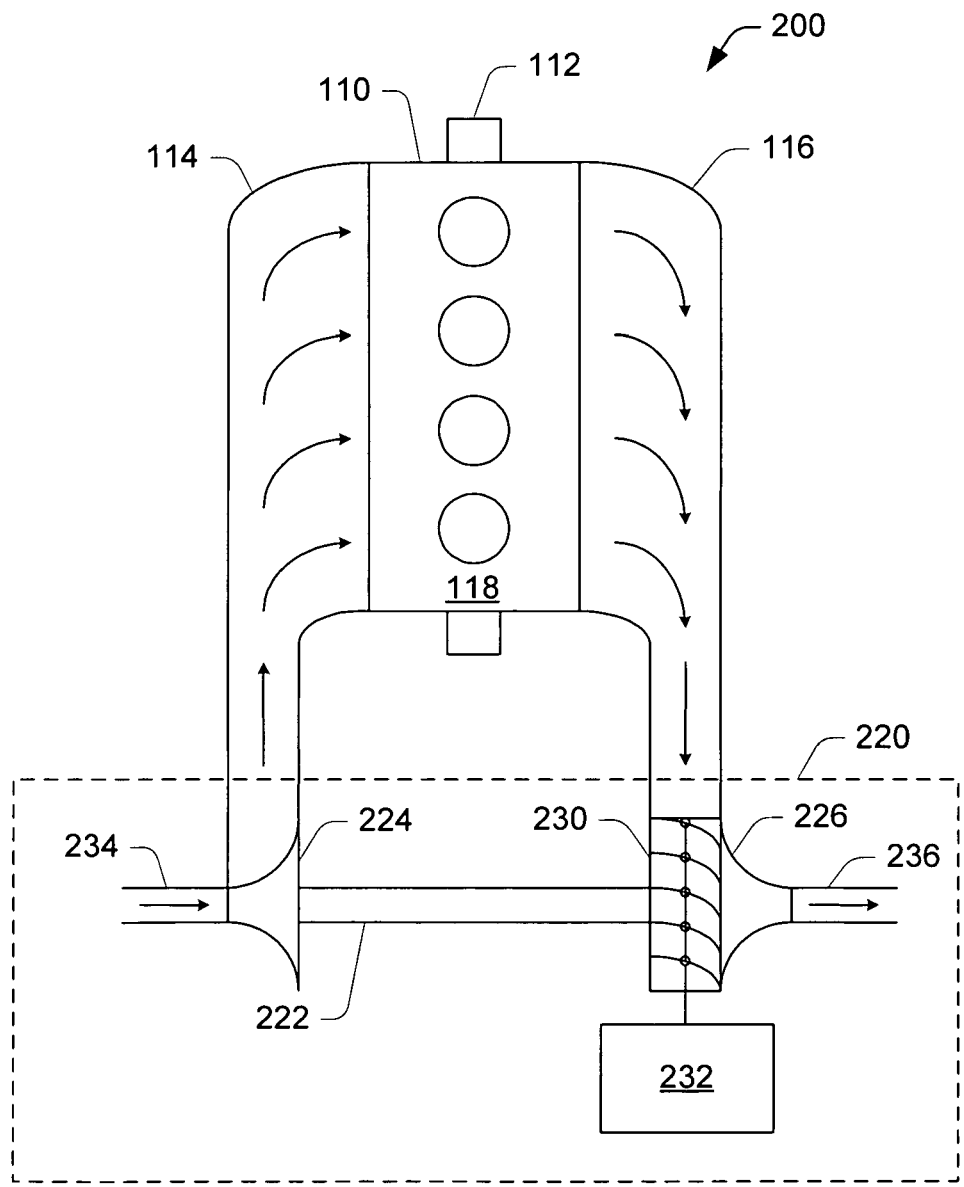
FIG. 2 is a simplified approximate diagram illustrating a variable geometry turbocharger and an internal combustion engine.

Referring to FIG. 2, in an exemplary system 200, another exemplary turbocharger 220 is shown along with an exemplary internal combustion engine 110 (see the engine 110 of FIG. 1). The exemplary turbocharger 220 includes a combustion air inlet 234, a shaft 222, a compressor 224, a turbine 226, a variable geometry unit 230, a variable geometry controller 232 and an exhaust outlet 236. The variable geometry unit 230 optionally has features such as those associated with commercially available variable geometry turbochargers (VGTs), such as, but not limited to, the GARRETT® VNT™ and AVNT™ turbochargers, which use multiple adjustable vanes to control the flow of exhaust across a turbine. Adjustable vanes positioned at an inlet to a turbine typically operate to control flow of exhaust to the turbine. For example, GARRETT® VNT™ turbochargers adjust the exhaust flow at the inlet of a turbine in order to optimize turbine power with the required load. Movement of vanes towards a closed position typically directs exhaust flow more tangentially to the turbine, which, in turn, imparts more energy to the turbine and, consequently, increases compressor boost. Conversely, movement of vanes towards an open position typically directs exhaust flow in more radially to the turbine, which, in turn, reduces energy to the turbine and, consequently, decreases compressor boost. Thus, at low engine speed and small exhaust gas flow, a VGT turbocharger may increase turbine power and boost pressure; whereas, at full engine speed/load and high gas flow, a VGT turbocharger may help avoid turbocharger overspeed and help maintain a suitable or a required boost pressure. A variety of control schemes exist for controlling geometry, for example, an actuator tied to compressor pressure may control geometry and/or an engine management system may control geometry using a vacuum actuator. Overall, a VGT may allow for boost pressure regulation which may effectively optimize power output, fuel efficiency, emissions, response and/or wear. Of course, an exemplary turbocharger may employ wastegate technology as an alternative or in addition to aforementioned variable geometry technologies.

Figure 3:
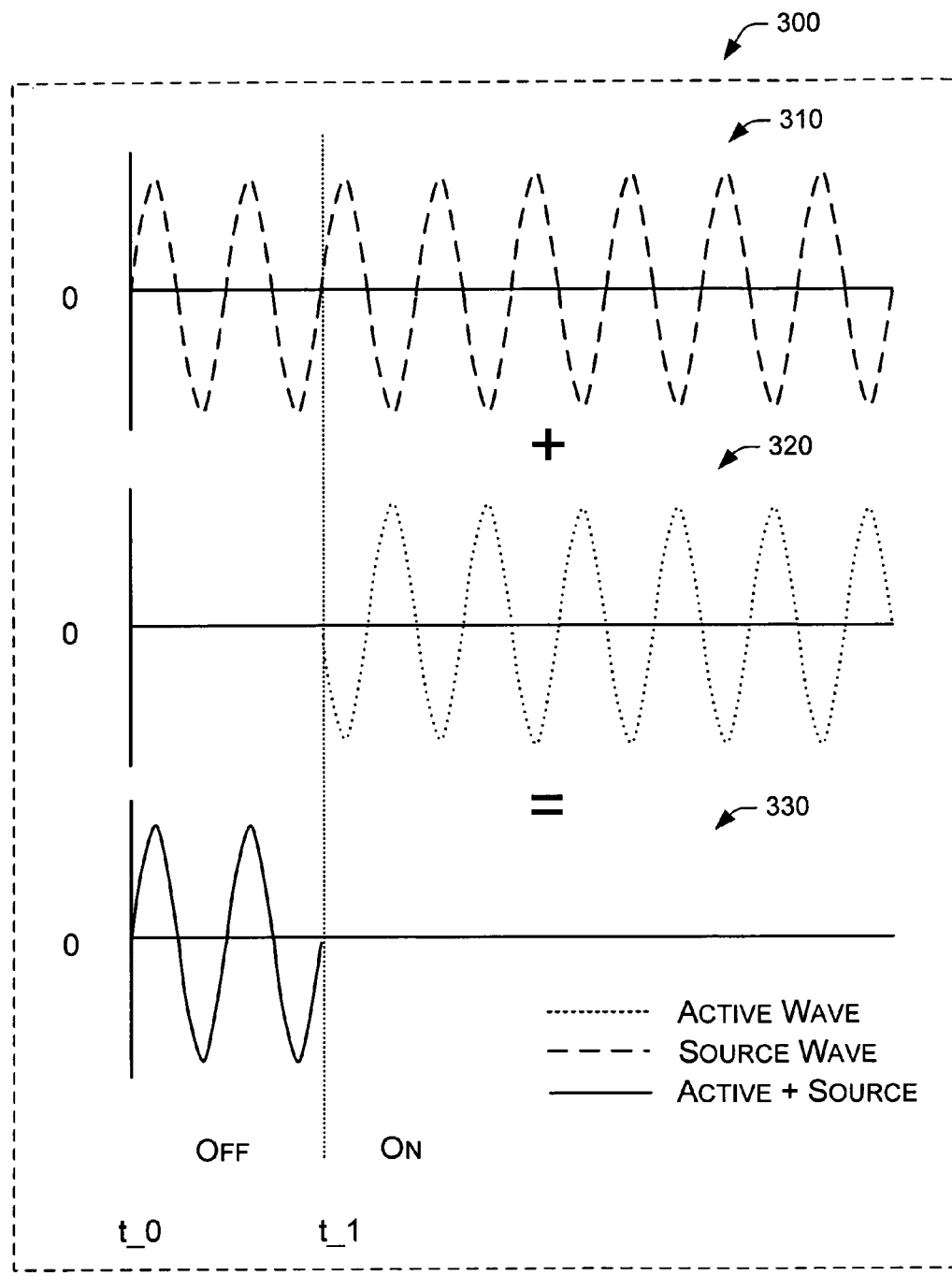
FIG. 3 is a simplified approximate graphical diagram illustrating an exemplary theory of noise control.

Referring to FIG. 3, an approximate illustration of an active noise control response is shown in the form of a series of graphs 300. The ordinate represents amplitude of vibration waveforms and/or acoustic waveforms whereas the abscissa represents time. In a time period from approximately t_0 to approximately t_1, a source waveform 310 produces noise and because an active waveform 320 has zero amplitude during this time period, the sum of the source waveform 310 and the active waveform 320 do not cancel; thus, a noise exists during the time period from t_0 to t_1 as shown in an additive waveform 330. At a time of approximately t_1, active noise control is implemented ("on"). Active noise control involves, for example, introduction of one or more active waveforms. An exemplary active waveform 320 appears in FIG. 3 and is represented by the dotted waveform 320 for time greater than and/or equal to t_1. In this instance, the active waveform 320 (dotted) and the source waveform 310 (dashed) cancel, as represented by the solid horizontal line at approximately zero amplitude in the additive waveform 330. Cancellation occurs theoretically when an active waveform has exactly the same frequency and amplitude as the source waveform but shifted 180° in phase such that each peak coincides with a trough and the sum cancels.

As described herein, various exemplary methods, devices and/or systems aim to alter vibration and/or acoustic noise. Alteration includes reduction in amplitude or amplitudes of noise and/or reduction in frequency or frequencies of noise. Of course, an increase in frequency may optionally occur, for example, to more effectively dissipate energy over time. The exemplary methods, devices and/or systems optionally rely on one or more actuators that can impart energy. In general, a controller determines energy characteristics output by the one or more actuators. A controller may consider information from a variety of sources, such as, but not limited to, sensors, data tables, mathematical models, user input, learning systems, etc.

As already mentioned, a turbocharger typically includes a rotating shaft and one or more bearings wherein instabilities may arise between the shaft and a bearing to create a source of vibration and/or acoustic noise. Again, vibration may occur in such shaft and bearing systems, for example, in the form of synchronous whirl, subsynchronous whirl and/or non-synchronous whirl. The term "synchronous" typically refers to whirl at the natural frequency of a system wherein self-excited vibration occurs; the term "subsynchronous" typically refers to whirl at frequencies less than those of a given rotating speed; and the term "nonsynchronous" (or "asynchronous") typically refers to whirl unrelated to speed characteristics of a shaft and bearing system. While whirl typically occurs as a rotational (e.g., orbital) motion of the shaft centerline in the direction of shaft rotation, reverse whirl may also occur. In oil lubricated shaft and bearing system, the terms "oil whirl" or "oil whip" typically refer to unstable vibration due to insufficient loading.

Figure 4:
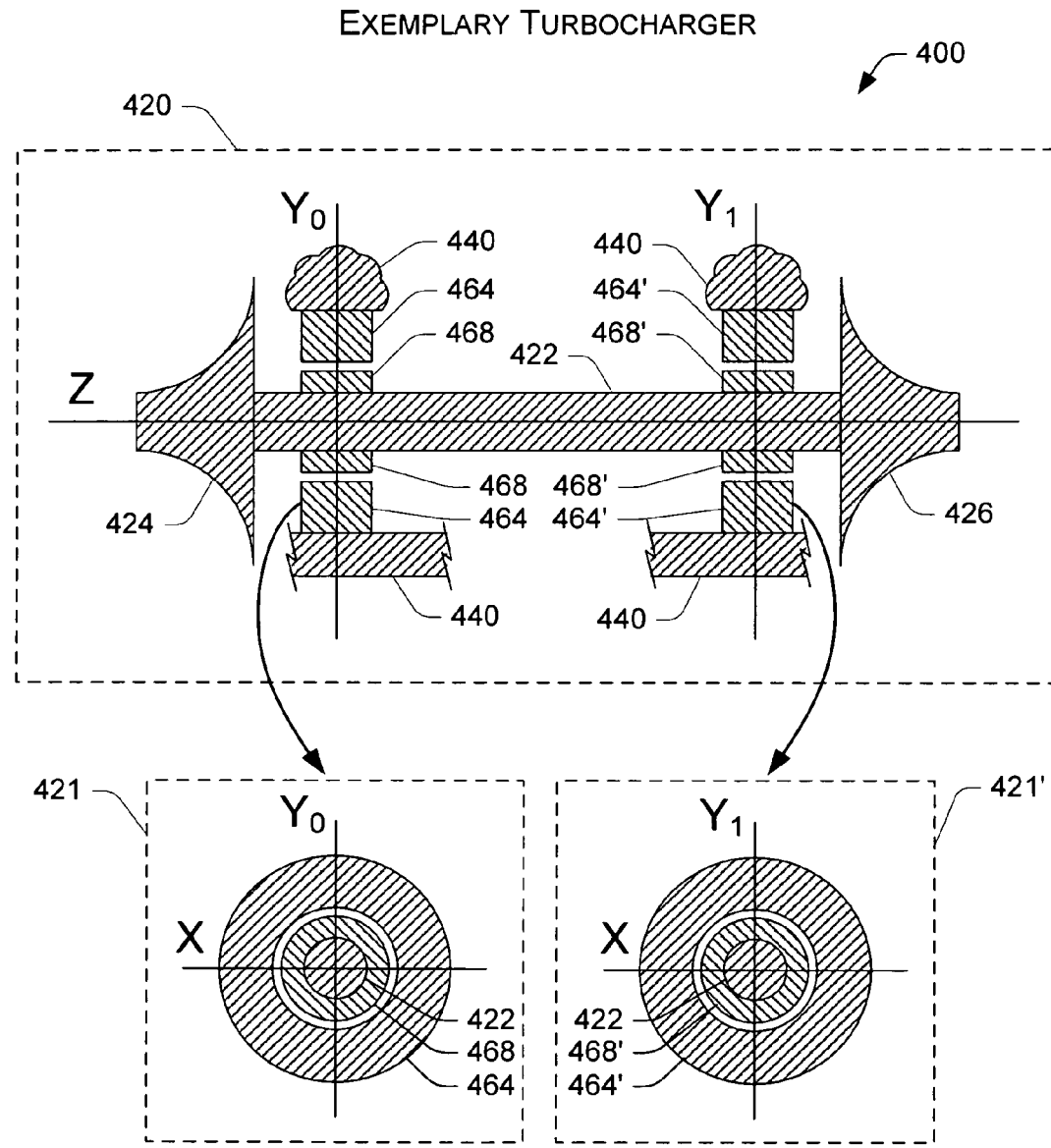
FIG. 4 is an approximate diagram illustrating various cross-section views of an exemplary turbocharger and/or exemplary bearing assemblies.

Referring to FIG. 4, various approximate cross-sectional diagrams 400 of an exemplary shaft and bearing turbocharger 420 is shown. One cross-sectional diagram through a Z-Y plane depicts the turbocharger 420 as having a shaft 422 with a centerline of rotation along the Z-axis. Two exemplary bearing assemblies 421, 421' are shown at positions $Y_0$ and $Y_1$, along with additional cross-sectional diagrams of the bearing assemblies 421, 421' in X-Y planes. As shown in FIG. 4, the exemplary bearing assemblies 421, 421' of the turbocharger 420 are mounted in a support 440. The various cross-sectional diagrams show the exemplary bearing assemblies 421, 421' having an outer ring 464, 464' mounted in the support 440 and an inner ring 468, 468' mounted on the shaft 422. Of course, other types of bearings and/or bearing assemblies may be suitable for use in such an exemplary turbocharger.

As shown in FIG. 4, a clearance or gap exists in each of the bearing assemblies 421, 421' between the outer rings 464, 464' and their respective inner rings 468, 468'. Each gap may allow for undesirable motion, such as, aforementioned forms of whirl. Further Such motion may generate noise whereby a bearing becomes a source of noise. Again, noise generation may originate with any of a variety of vibrations, such 6 as, but not limited to, aforementioned vibrations (e.g., whirl, etc.). Again, while FIG. 4 shows approximate exemplary bearings (e.g., bearing assemblies 421, 421'), a variety of other bearing types and/or numbers are optionally suitable.

Referring again to FIG. 4, a turbocharger 420 typically includes a shaft 422, a compressor 424, a turbine 426, one or more bearing assemblies 421, 421' and a housing 440. Often precision machining and/or manufacturing are required to ensure proper operation of these components. For example, a manufacturing process may include shaft balancing, compressor balancing, turbine balancing, bearing balancing and balancing of any combination of sub-assemblies and a final assembly. As discussed herein, various exemplary systems and/or methods optionally alleviate and/or diminish a need for precision, balancing and/or matching of components. As explained in more detail below, exemplary systems and/or methods that control vibration associated with a rotating shaft may enhance performance and/or longevity. Thus, a trade-off is possible between production precision, balancing and/or matching and operation vibration control. Shifting production concerns to operation concerns optionally saves time and/or money and/or enhances performance and/or longevity. In addition, testing of a turbocharger (and/or supercharger)/noise control system prior to installation may allow for optimal positioning of actuators and/or sensors, selection of control logic, and/or development of a model and/or a look-up table for use in noise control. Such information, etc., is optionally programmed into memory and/or a processor for use in a controller, actuator, sensor, etc.

Figure 5:
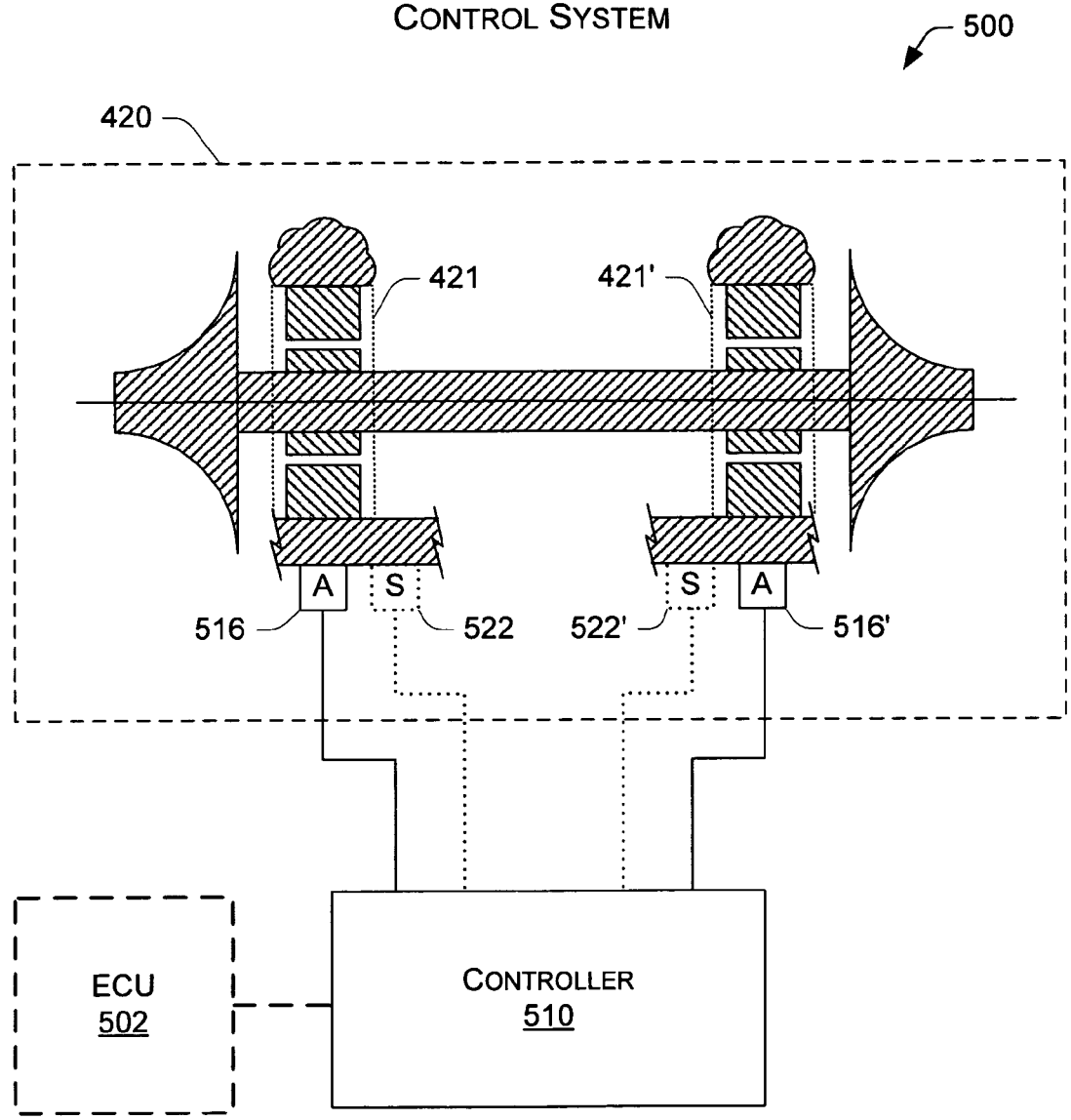
FIG. 5 is a block diagram illustrating an exemplary vibration control system.

Referring to FIG. 5, an exemplary control system 500 for controlling noise is shown along with the exemplary turbocharger 420 of FIG. 4. Of course, the exemplary control system 500 may optionally apply to the exemplary turbocharger 120 of FIG. 1 or the exemplary turbocharger 220 of FIG. 2. The exemplary control system 500 includes a controller 510, actuators ("A") 516, 516' and sensors ("S")

522, 522'. The system 500 further optionally includes an engine control unit 502 and/or a link to an engine control unit 502. In general, an exemplary control system includes one or more actuators (e.g., 516, 516') and/or one or more sensors (e.g., 522, 522') that are positionable at any of a variety of positions. As shown in FIG. 5, the sensors 522, 522' sense vibrations stemming from the turbocharger 420, for example, vibrations stemming from the shaft and bearing system of the turbocharger 420. In the exemplary control system 500, a first sensor 522 is positioned proximate to a first bearing assembly 421 and a second sensor 522' is positioned proximate to a second bearing assembly 421'. The exemplary control system 500 further includes a first actuator 516 positioned proximate to the first bearing assembly 421 and a second actuator 516' positioned proximate to the second bearing assembly 421'. The controller 510 is configured to receive vibration information from the first sensor 522 and/or the second sensor 522', process the vibration information separately and/or together and transmit control information to one or more of the actuators 516, 516'.

While the exemplary control system 500 includes one actuator and one sensor per bearing assembly, an alternative exemplary control system includes more than one actuator per bearing assembly and/or more than one sensor per bearing assembly. For example, referring again to FIG. 4 and the cross-sectional diagrams in the X-Y planes of the bearing assemblies 421, 421', an exemplary control system optionally includes orthogonally positioned actuators and/or sensors. In Such an exemplary control system, a first actuator is optionally positioned proximate to a bearing assembly along the Y-axis while a second actuator is optionally positioned proximate to the same bearing assembly along the X-axis. Of course, other actuator positions are also possible. In exemplary control systems having more than one actuator and/or more than one sensor per bearing assembly, an exemplary controller may have information pertaining to the position of any one actuator and/or sensor with respect to one or more other actuators and/or sensors.

As shown in FIG. 4, each of the exemplary bearing assemblies 421, 421' is primarily positioned in a plane (e.g., X-Y$_0$ plane, X-Y$_1$ plane); thus, two sensors and/or two actuators per bearing assembly may be sufficient to characterize shaft vibrations within a bearing assembly.

Figure 6:
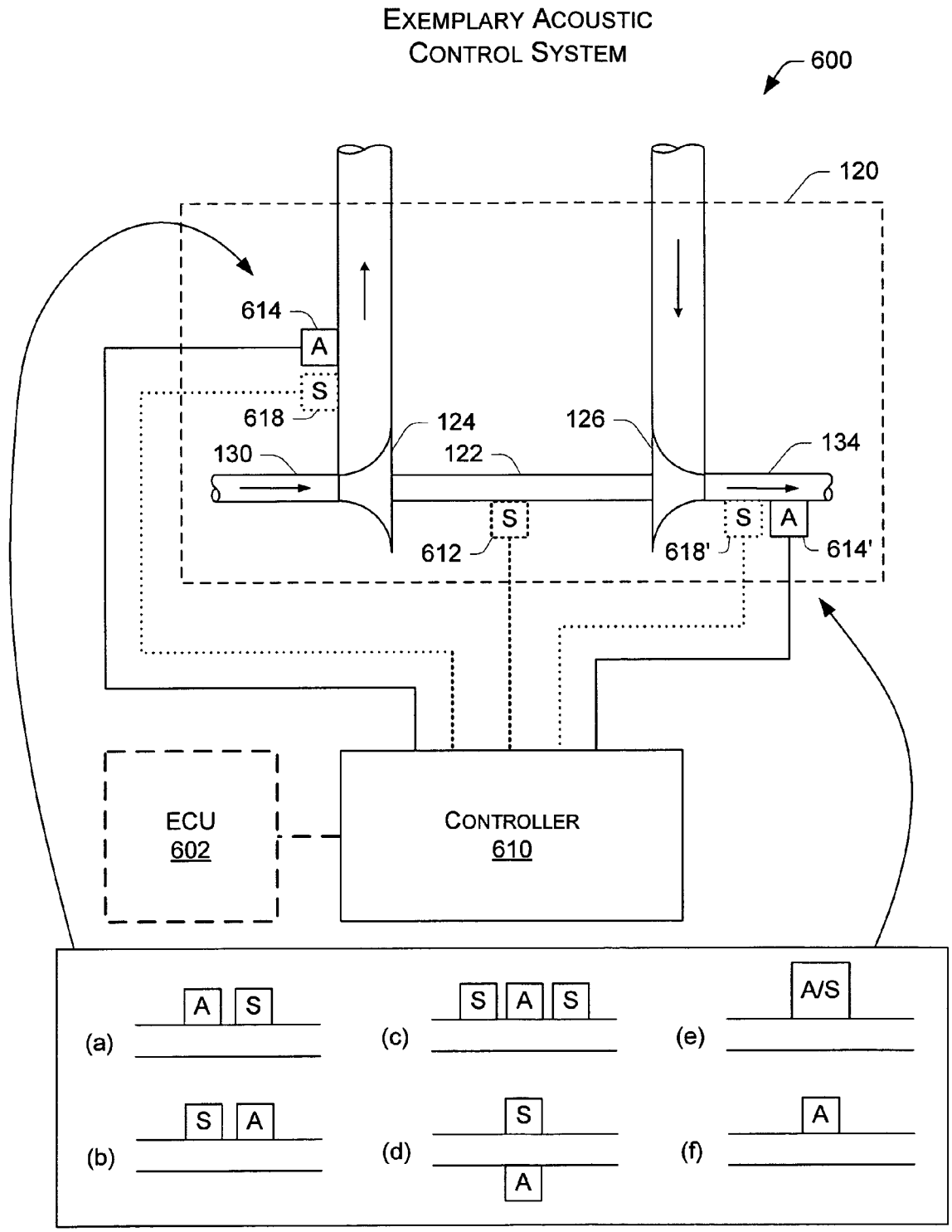
FIG. 6 is a block diagram illustrating an exemplary acoustic control system.

Referring to FIG. 6, an exemplary control system 600 for controlling noise is shown along with the exemplary turbocharger 120 of FIG. 1. Of course, the exemplary control system 600 may optionally apply to the exemplary turbocharger 220 of FIG. 2. The exemplary control system 600 includes a controller 610, actuators ("A") 614, 614' and optionally sensors ("S") 612, 618, 618', wherein the sensor 612 is optionally a speed sensor. The system 600 further optionally includes an engine control unit 602 and/or a link to an engine control unit 602. In general, an exemplary control system includes one or more actuators (e.g., 614, 614') and/or one or more sensors (e.g., 612, 618, 618') that are positionable at any of a variety of positions. A variety of exemplary positions for actuators and/or sensors are shown and labeled (a) through (f). For example, (a) includes an actuator and a sensor downstream thereof; (b) includes a sensor and an actuator downstream thereof; (c) includes an actuator positioned between two sensors (also including a sensor positioned between two actuators, etc.); (d) includes a sensor and an actuator positioned approximately opposite each other (also including other angles between the sensor and actuator); (e) includes a sensor/actuator which optionally functions as both a sensor and an actuator; and (f) includes only an actuator. Of course, the positions shown in (a) through (t) are only exemplary as other positioning may also be implemented.

As shown in FIG. 6, the sensors 618, 618' sense noise stemming at least in part from the compressor 124 and/or the turbine 126. In the exemplary control system 600, a first sensor 618 is positioned proximate to the compressor 124 and a second sensor 618' is positioned proximate to the turbine 126. The exemplary control system 600 further includes a first actuator 614 positioned proximate to the compressor 124 and a second actuator 614' positioned proximate to the turbine 126. The controller 610 is configured to receive noise information from the first sensor 618 and/or the second sensor 618', process the vibration information separately and/or together and transmit control information to one or more of the actuators 614, 614'. In turn, the actuators 614, 614' generate waveforms based on the control and/or other information, which typically act to reduce noise.

While the exemplary control system 600 includes one actuator and one sensor per compressor or turbine, an alternative exemplary control system includes more than one actuator per compressor or turbine and/or more than one sensor per compressor or turbine. For example, an exemplary control system optionally includes orthogonally positioned actuators and/or sensors. Of course, other actuator positions are also possible. In exemplary control systems having more than one actuator and/or more than one sensor per compressor or turbine, an exemplary controller may have information pertaining to the position of any one actuator and/or sensor with respect to one or more other actuators and/or sensors.

Figure 7:
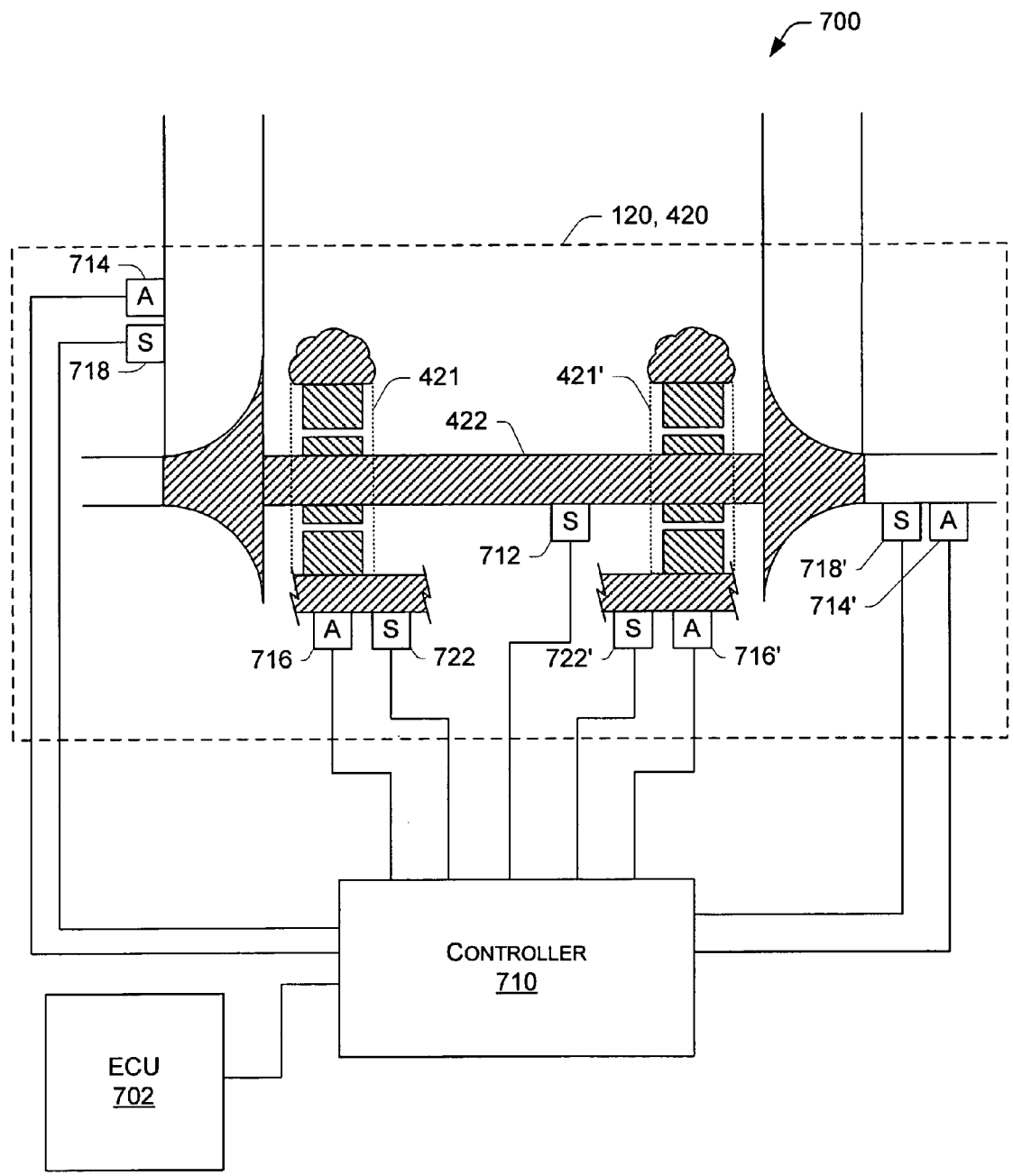
FIG. 7 is a block diagram illustrating an exemplary noise control system.

Referring to FIG. 7, an exemplary control system 700 for controlling noise is shown along with the exemplary turbocharger 120 of FIG. 1. Of course, the exemplary control system 700 may optionally apply to the exemplary turbocharger 220 of FIG. 2. The exemplary control system 700 includes a controller 710, actuators ("A") 714, 714', 716, 716' and sensors ("S") 712, 718, 718', 722, 722'. The system optionally includes an engine control unit 702 and/or a link to an engine control unit 702. In general, an exemplary control system includes one or more actuators (e.g., 714, 714', 716, 716') and/or one or more sensors (e.g., 712', 718, 718', 722, 722') that are positionable at any of a variety of positions. As shown in FIG. 7, the sensor 712 senses rotation (e.g., speed, etc.) of the shaft 122. In the exemplary control system 700, the sensor 712 is positioned proximate to the shaft 712. Other sensors sense acoustic noise (e.g., proximate to an intake and/or compressor 718, proximate to an exhaust and/or turbine) and/or vibration noise (e.g., proximate to a bearing, bearing assembly, and/or housing 722, 722'). The various sensors (e.g., 712, 718, 718', 722, 722') include one or more links to the controller 710 and/or optionally the engine control unit 702.

The exemplary control system 700 further includes a first actuator 714 for acoustic noise positioned proximate to the compressor 124, a second actuator 714' for acoustic noise positioned proximate to the turbine 126, a first actuator 716 for vibration noise positioned proximate to a bearing assembly 421 and a second actuator 716' for vibration noise positioned proximate to a bearing assembly 421'. The various actuators (e.g., 714, 714', 716, 716') include one or more links to the controller 710 and/or optionally the engine control unit 702.

The controller 710 is configured to receive rotation information from for example, the sensor 712, and/or the ECU 702, process the information and transmit control information to one or more of the actuators (e.g., 714, 714', 716, 716'). An exemplary controller (e.g., the controller 710) optionally determines control information on the basis of a priori knowledge of turbocharger characteristics wherein such knowledge is optionally learned and/or programmed. For example, a turbocharger is optionally characterized as a function of speed wherein predictable source waveforms occur at a speed(s). In Such an exemplary control system, an active waveform(s) is generated on the basis of rotation information (see, e.g., FIG. 3). Of course, a variety of other parameters may also be used to characterize source waveforms (e.g., pressure, temperature, load, etc.). Such parameters are optionally provided by the ECU 702 and/or an external component. In addition, such an exemplary system uses vibration as a function of speed and/or load, a look-Lip table, etc., for controlling noise.

While the exemplary control system 700 includes one actuator per compressor or turbine, an alternative exemplary control system includes more than one actuator per compressor or turbine. For example, an exemplary control system optionally includes orthogonally positioned actuators. Of course, other actuator positions are also possible. In exemplary control systems having more than one actuator per compressor or turbine, an exemplary controller may have information pertaining to the position of any one actuator and/or sensor with respect to one or more other actuators and/or sensors.

Figure 8:
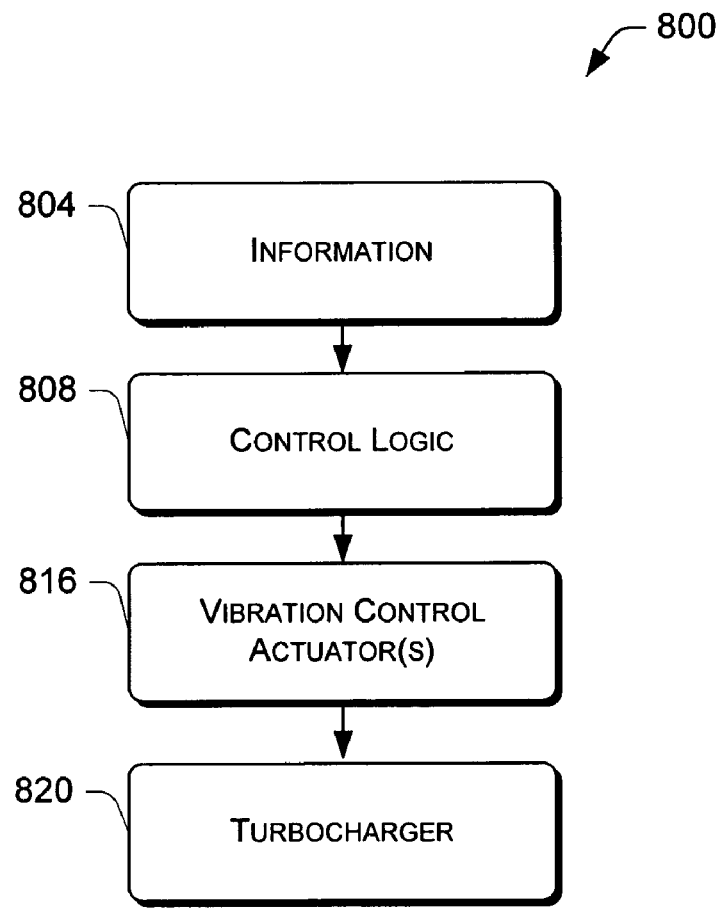
FIG. 8 is a block diagram illustrating an exemplary control system and/or method for vibration noise.

Referring to FIG. 8, an exemplary system and/or method 800 for vibration noise control is shown. In a reception block 804, a controller receives information regarding vibration of a shaft and bearing system. Next, in a control logic block 808, a controller processes the information and determines one or more control parameters. In an actuator block 816, the controller transmits the one or more control parameters to one or more vibration control actuators. In a turbocharger block 820, the one or more actuators act upon the turbocharger block 820 (e.g., the turbocharger and/or a component in contact with the turbocharger). As shown in FIG. 8, the exemplary system and/or method 800 optionally operates in an open-loop.

Figure 9:
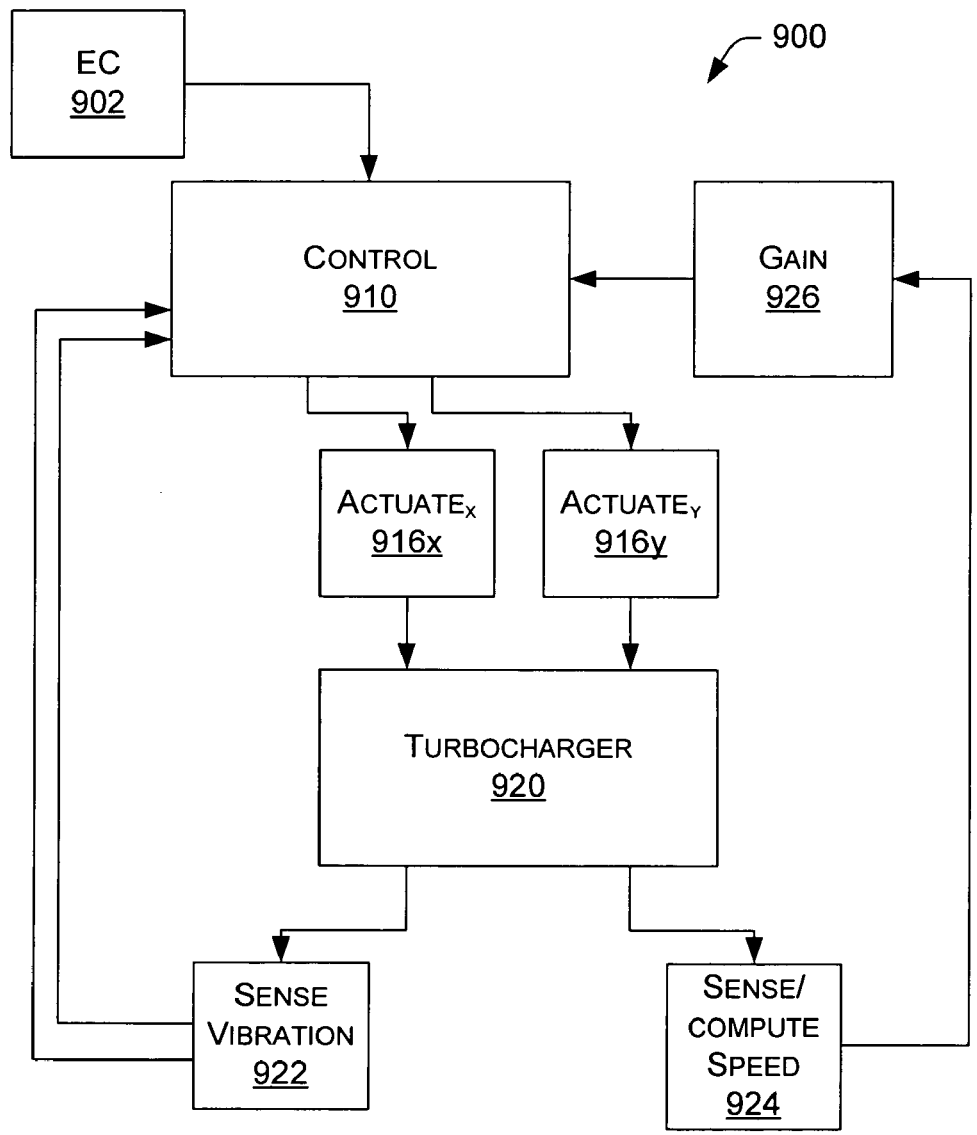
FIG. 9 is a block diagram of an exemplary control system and/or method for vibration noise having, for example, approximately orthogonal actuators.

Referring to FIG. 9, an exemplary system and/or method 900 for noise control is shown. The exemplary system and/or method 900 optionally operates in a closed-loop. As shown in FIG. 9, a control block 910 receives information from a vibration sense block 922, a gain adjustment block 926 and optionally an engine control (EC) block 902. The control block 910 processes the information, determines one or more control parameters and transmits the one or more control parameters to one or more actuate blocks 916x, 916y. The actuate blocks 916x, 916y optionally operate to effect orthogonal control, for example, wherein one actuate block 916x operates along a first axis and the other actuate block 916y operates along an axis orthogonal to the first axis and/or at another angle to the first axis. The actuate blocks 916x, 916y act upon the turbocharger block 920 (e.g., a turbocharger and/or a component in contact with the turbocharger). For example, an actuate block typically acts through use of an actuator, such as, but not limited to, a piezoelectric actuator capable of generating one or more waveforms. In general, a waveform has characteristics that may reduce and/or cancel a source waveform that is responsible for noise and/or other deleterious vibration.

The vibration sense block 922 senses vibration information regarding operation of the turbocharger block 920 whereas a speed determination block 924 senses and/or determines rotational speed of the turbocharger block 920. The speed determination block 924, which senses and/or determines speed, optionally links to a Cain block 926 and/or directly to the control block 910. Of course, a variety of sensors and/or actuators blocks (e.g., 916x, 916y, 922, 924) and/or an engine control block 902 may link to the gain block 926. Again, the exemplary system and/or method 900, as shown in FIG. 9, operates typically in a closed-loop. For example, as shown in FIG. 9, the control block 910 transmits control information to one or more of the actuate blocks 916x, 916y and receives feedback from the sense block 922.

Figure 10:
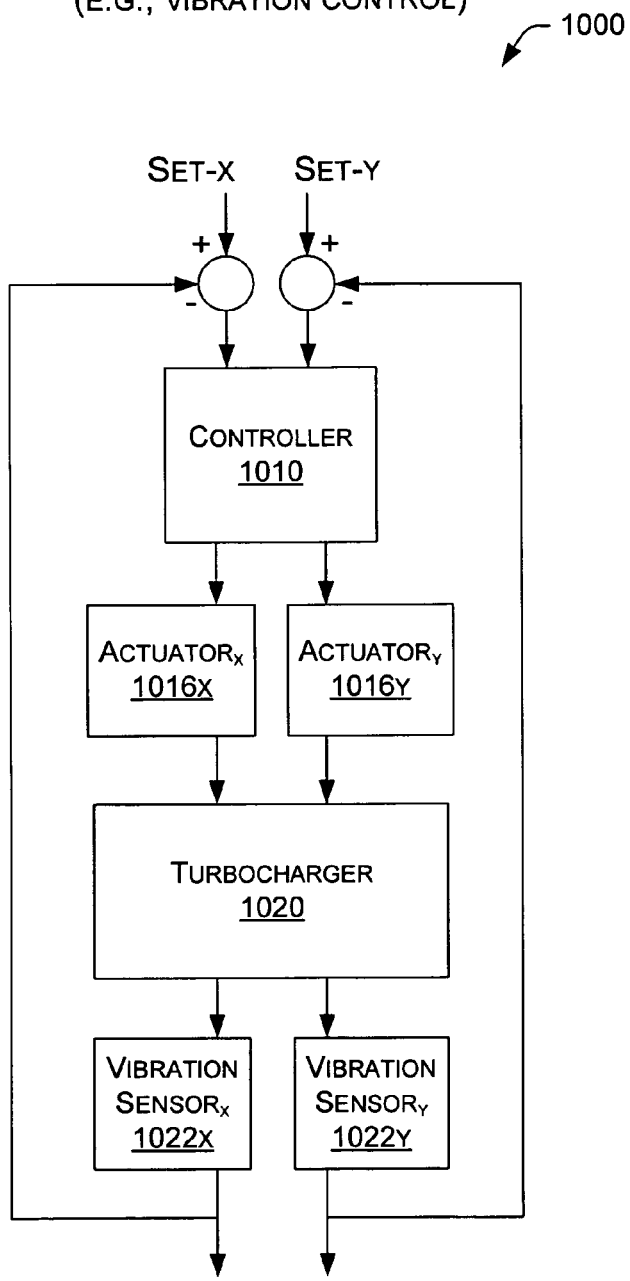
FIG. 10 is a block diagram of an exemplary control system and/or method for vibration noise having, for example, approximately orthogonal actuators and approximately orthogonal sensors.

Referring to FIG. 10, an exemplary system and/or method 1000 for noise control is shown. The exemplary system and/or method 1000 optionally operates in one or more closed-loops. As shown in FIG. 10, a set value for "x" vibration control (e.g., Set-x) and/or a set value for "y" vibration control (e.g., Set-y) are input to an x vibration control junction and a y vibration control junction, respectively. The x vibration control junction may also receive information (e.g., a signal, etc.) from an x vibration sensor block 1022x and the y vibration control junction may also receive information (e.g., a signal, etc.) from a y vibration sensor block 1022y. The x vibration control junction and the y vibration control junction link (e.g., via communication links, optionally including wireless links) to a controller 1010 whereby, the control junctions optionally provide information to the controller 1010. The controller 1010 uses control logic and/or the information from the control junctions and/or other component to generate actuator control information, wherein the actuator control information optionally includes control information for an "x" actuator 1016x and/or control information for a "y" actuator 1016y. The controller 1010 then typically provides the x actuator 1016x and/or the y actuator 1016y with Such control information.

The x actuator 1016x and the y actuator 1016y act upon a turbocharger 1020 typically in an effort to reduce and/or otherwise control vibration. An actuate block typically acts through use of an actuator, such as, but not limited to, a piezoelectric actuator capable of generating one or more waveforms. In general, a waveform has characteristics that may reduce and/or cancel a source waveform that is responsible for noise and/or other deleterious vibration. In turn, an "x" vibration sensor 1022x and/or a "y" vibration sensor 1022y sense vibration stemming from, for example, the turbocharger 1020. Further, as already mentioned, the x vibration sensor 1022x and/or the y vibration sensor 1022y optionally link to one or more control junctions (e.g., an x control junction, a y control junction, etc.).

Figure 11:
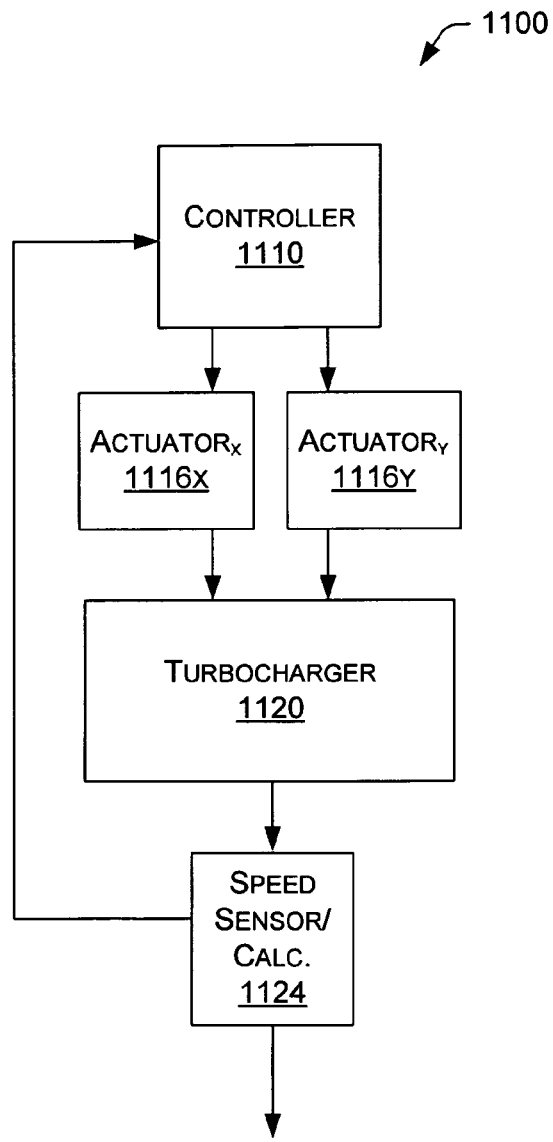
FIG. 11 is a block diagram illustrating an exemplary control system and/or method for vibration noise having a speed sensor and/or speed determination block.

Referring to FIG. 11, an exemplary system and/or method 1100 for noise control is shown. A controller block 1110 uses control logic and/or information from a speed sensor block 1124, which optionally determines speed, and/or other component to generate actuator control information, wherein the actuator control information optionally includes control information for an "x" actuator 1116x and/or control information for a "y" actuator 16y. The controller 1110 then typically provides the x actuator 1116x and/or the y actuator 1116y with such control information.

The x actuator 1116x and the y actuator 1116y act upon a turbocharger 1120 typically in an effort to reduce and/or otherwise control vibration. An actuate block typically acts through use of an actuator, such as, but not limited to, a piezoelectric actuator capable of generating one or more waveforms. In general, a waveform has characteristics that may reduce and/or cancel a source waveform that is responsible for noise and/or other deleterious vibration.

The speed sensor block 1124 typically senses and/or otherwise receives information related to speed of a shaft of the turbocharger 1120, which it optionally uses to determine speed and/or provide information to the controller 1110 and/or an engine control unit. An exemplary control system and/or method optionally knows a priori and/or learns vibration characteristics of a turbocharger as a function of shaft rotational speed and/or some other parameter. According to such an exemplary system and/or method, vibration control is responsive to shaft rotational speed and/or some other performance related parameter.

Figure 12:
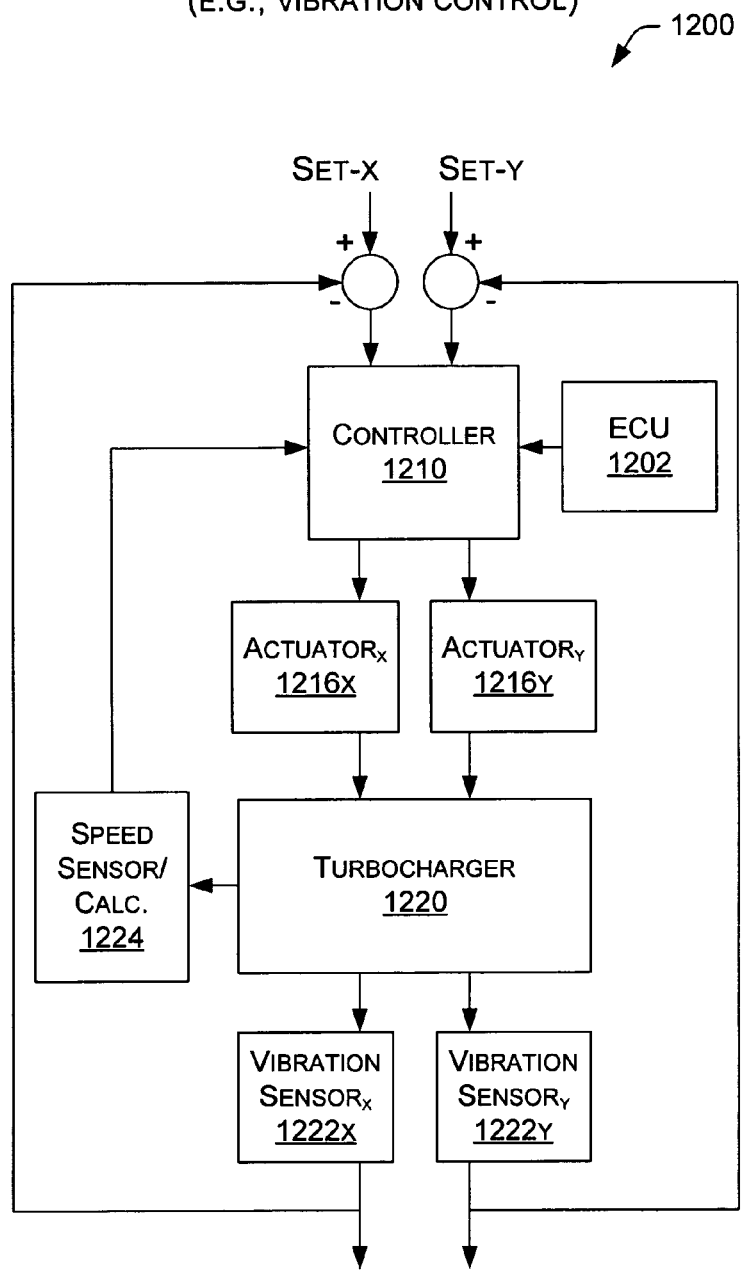
FIG. 12 is a block diagram illustrating an exemplary control system and/or method for vibration noise having actuators, sensors and a speed sensor and/or speed determination block.

Referring to FIG. 12, an exemplary system and/or method 1200 for noise control is shown. The exemplary system and/or method 1200 optionally operates in one or more closed-loops. As shown in FIG. 12, a set value for "x" vibration control and/or a set value for "y" vibration control are input to an x vibration control junction and a y vibration control junction, respectively. The x vibration control junction may also receive information (e.g., a signal, etc.) from an x vibration sensor block 1222$x$ and the y vibration control junction may also receive information (e.g., a signal, etc.) from a y vibration sensor block 1222$y$. The x vibration control junction and the y vibration control junction link (e.g., via communication links, optionally including wireless links) to a controller 1210 whereby, the control junctions optionally provide information to the controller 1210. The controller 1210 uses control logic and/or the information from the control junctions and/or other component to generate actuator control information, wherein the actuator control information optionally includes control information for an "x" actuator 2126$x$ and/or control information for a "y" actuator 1216$y$. The controller 1010 then typically provides the x actuator 1016$x$ and/or the y actuator 1016$y$ with such control information.

Regarding other components that optionally link to the controller 1210, as shown, a speed sensor block 1224, which senses and/or determines speed, has a link to the controller 1210 to provide information relevant to noise control. The speed sensor block 1224 optionally operates in a manner similar to the speed sensor block 1124 of FIG. 11. In addition, an engine control unit (ECU) 1202 optionally links to the controller 1210 and/or other components of such an exemplary system. The ECU 1202 provides, for example, information related to engine performance and/or operational parameters, such as, but not limited to, acceleration, deceleration, coolant temperature(s), fuel quantity and/or quality, air pressure, air temperature, etc.

The x actuator 1216$x$ and the y actuator 1216$y$ act upon a turbocharger 1220 typically in an effort to reduce and/or otherwise control vibration. An actuate block typically acts through use of an actuator, such as, but not limited to, a piezoelectric actuator capable of generating one or more waveforms. In general, a waveform has characteristics that may reduce and/or cancel a source waveform that is responsible for noise and/or other deleterious vibration. In turn, an "x" vibration sensor 1222$x$ and/or a "y" vibration sensor 1222$y$ sense vibration stemming from, for example, the turbocharger 1220. Further, as already mentioned, the x vibration sensor 1222$x$ and/or the y vibration sensor 1222$y$ optionally link to one or more control junctions (e.g., an x control junction, a y control junction, etc.).

Figure 13:
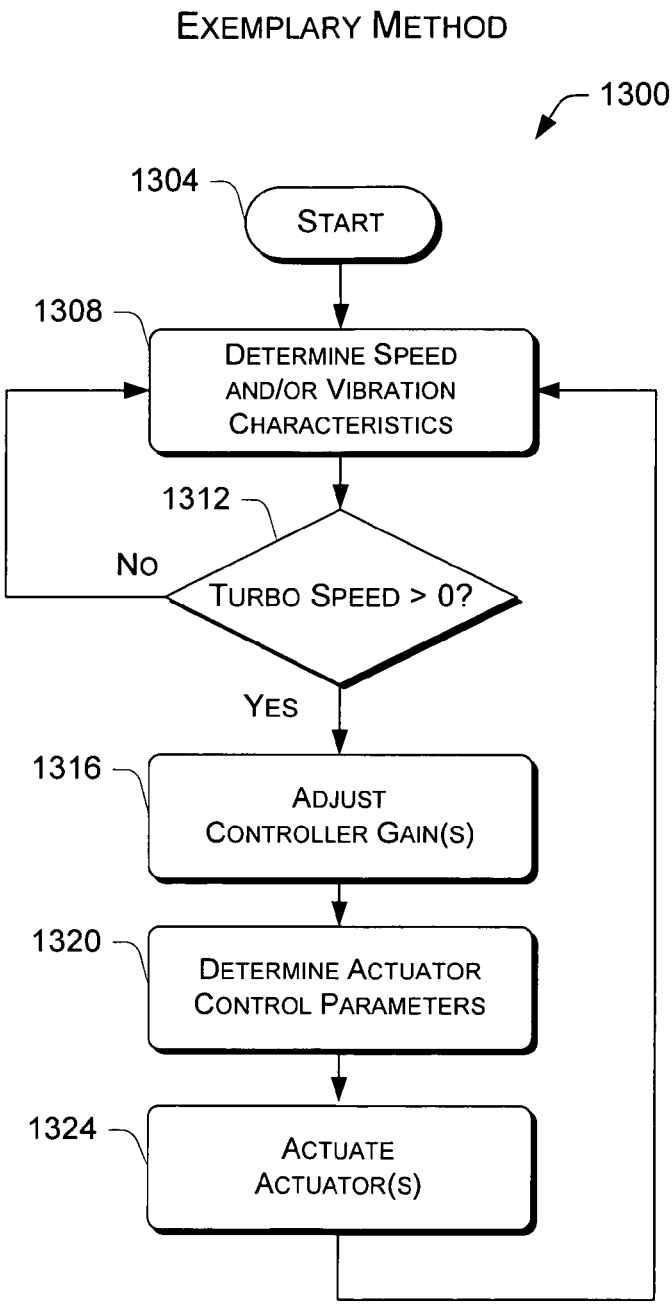
FIG. 13 is a block diagram of an exemplary method for controlling vibration noise.

Referring to FIG. 13, an exemplary method 1300 is shown. In a start block 1304, control commences. Next, in a determination block 1308, a controller and/or a sensor determines speed and/or vibration characteristics. A check block 1312 follows wherein the controller determines if the speed of the turbocharger is greater than zero, some other value. Of course, any of a variety of parameters other than speed is optionally used in a check block or other block to determine proper control, for example, to determine whether actuation of one or more active waveform actuators is a suitable control strategy to reduce noise. If the check block 1312 determines and/or otherwise indicates that the turbocharger shaft speed is zero, then the system and/or method Continue at the determination block 1308. Alternatively, if the check block 1312 determines and/or otherwise indicates that the turbocharger shaft speed is greater than zero (or other value), then the system and/or method continues in the adjustment block 1316 or an actuator parameter determination block 1320. The adjustment block 1316, while optional, adjusts controller gain(s) typically associated with one or more sensors and/or actuators. Adjustment of sensor gain prior to determination of actuator parameters typically allows for more robust control. The actuator parameter determination block 1320 determines control parameters for one or more actuators. An actuation block 1324 uses such information to actuate one or more actuators, which, in turn, act upon the turbocharger in an effort to reduce noise. Following the actuation block 1324, the system and/or method continues at the determination block 1308. While the exemplary control system and/or method is optionally used in a "cool down" period, the control system and/or method typically halt operation once the engine is shut off.

Figure 14:
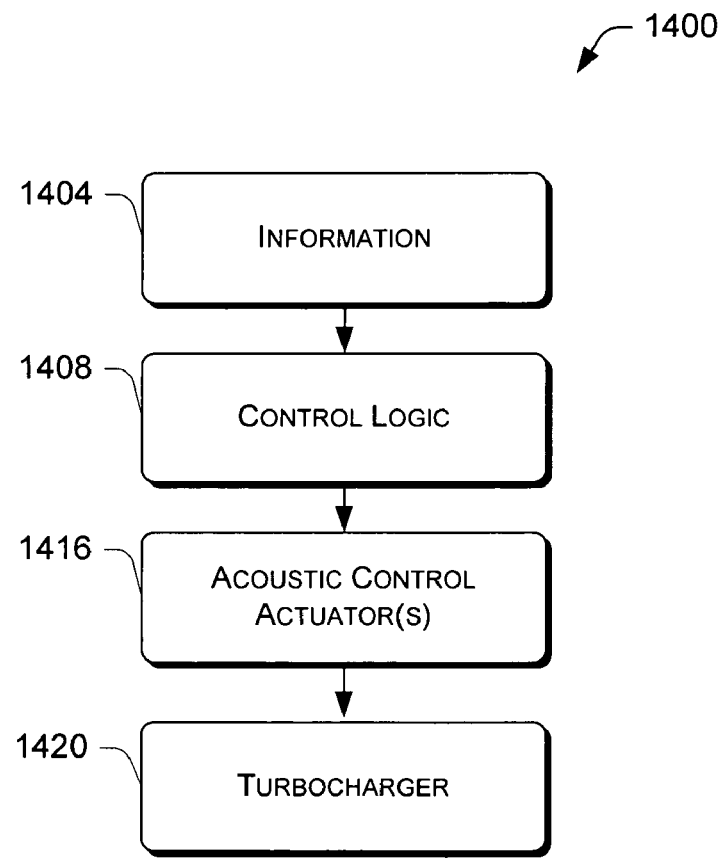
FIG. 14 is a block diagram illustrating an exemplary control system and/or method for acoustic noise.

Referring to FIG. 14, an exemplary method 1400 for acoustic noise control is shown. In a reception block 1404, a controller receives information regarding acoustic noise, turbine speed, compressor speed, etc. Next, in a control logic block 1408, a controller processes the information and determines one or more control parameters. In an actuator block 1416, the controller transmits the one or more control parameters to one or more acoustic control actuators. In a turbocharger block 1420, the one or more actuators act upon the turbocharger block 1420 (e.g., the turbocharger and/or a component in contact with the turbocharger). Of course, the actuator block 1416 optionally acts upon an intake and/or a compressor and/or an exhaust and/or a turbine. As shown in FIG. 14, the exemplary system and/or method 1400 optionally operates in an open-loop.

Figure 15:
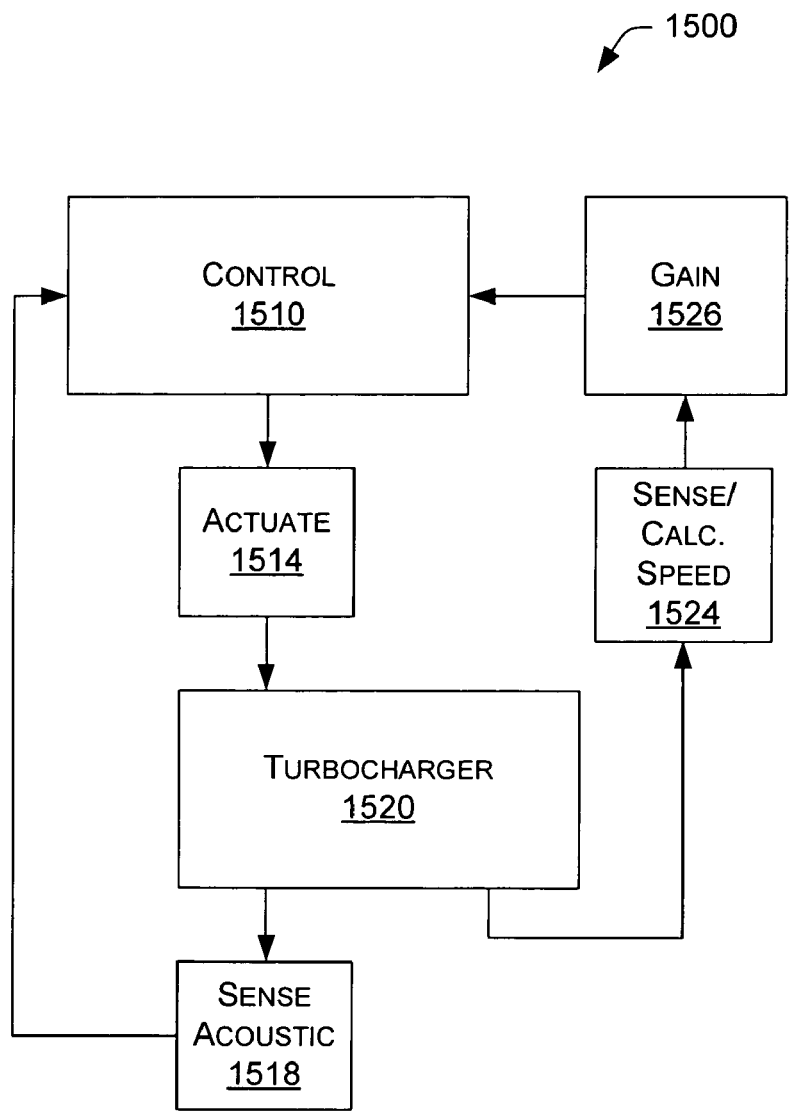
FIG. 15 is a block diagram illustrating an exemplary control system and/or method for acoustic noise.

Referring to FIG. 15, an exemplary system and/or method 1500 for controlling noise is shown. A control block 1510 receives information from a sense block 1518 and/or a gain adjustment block 1526. Of course, other components may optionally provide information to the control block 1510, such as, but not limited to, an engine control unit. The control block 1510, on the basis of such information and/or other information, determines one or more actuator control parameters. As shown, the control block 1510 transmits one or more actuator control parameters to an actuate block 1514. In turn, the actuate block 1514 acts upon a turbocharger block 1520, where in this exemplary systems and/or method, the turbocharger block 1520 optionally includes upstream and/or downstream components (e.g., components of an intake system and/or an exhaust system). While actuators often produce optimal results when positioned proximate to a source of noise, as disclosed herein, actuators are optionally located at any of a variety of positions, some of which may be distant from the source. For example, an exemplary system and/or method include use of an actuator positioned proximate to an exhaust outlet, where exhaust discharges to the atmosphere. In this example, one or more active waveforms emitted by the actuator optionally travel toward the source(s). Yet other exemplary systems and/or methods include actuators positioned proximate to a person or persons (e.g., occupants of a vehicle). Referring, again to FIG. 15, a speed determination block 1524 senses and/or determines rotational speed of the turbocharger block 1520.

The gain adjustment block 1526 receives information from the speed determination block 1524 and optionally uses such information and/or other information to make adjustments in gain. Of course, the speed determination block 1524 may optionally link directly to the control block 1510.

Figure 16:
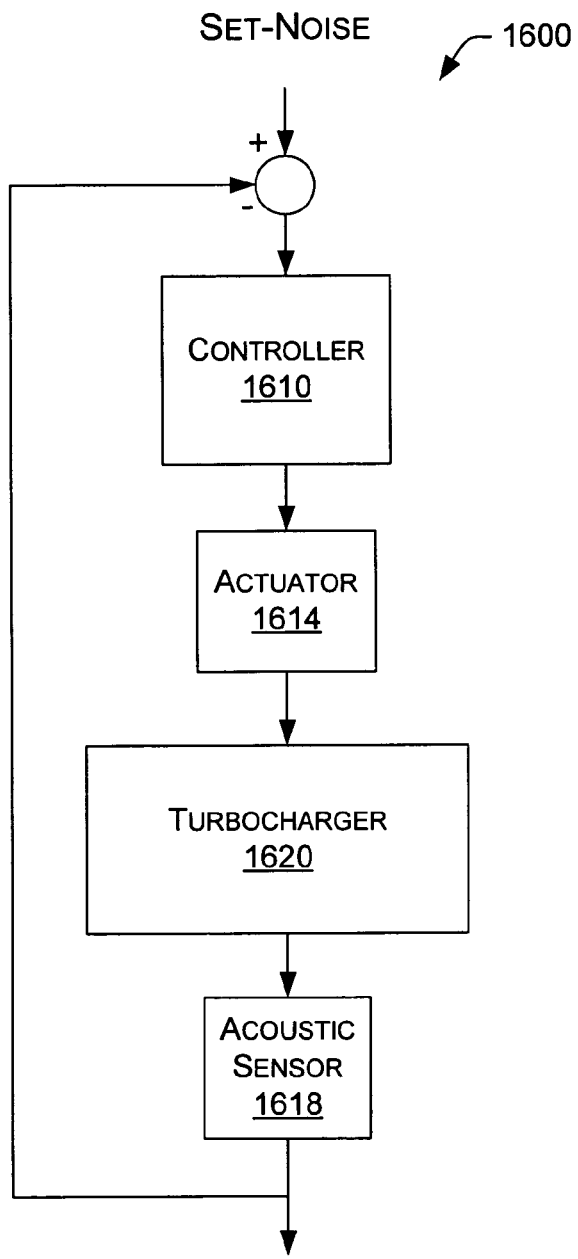
FIG. 16 is a block diagram illustrating an exemplary control system and/or method for acoustic noise having one or more actuators and one or more acoustic noise sensors.

Referring to FIG. 16, an exemplary system and/or method 1000 for noise control is shown. The exemplary system and/or method 1600 optionally operates in one or more closed-loops. As shown in FIG. 16, a set value for acoustic control (e.g., Set-Noise) is input to an acoustic noise control junction. The acoustic control junction may also receive information (e.g., a signal, etc.) from an acoustic sensor block 1618. The acoustic control junction links (e.g., via communication links, optionally including wireless links) to a controller 1610 whereby, the control junction optionally provides information to the controller 1610. The controller 1610 uses control logic and/or the information from the control junction and/or other component to (generate actuator control information, wherein the actuator control information optionally includes control information for an acoustic actuator 1614 and/or other actuators. The controller 1610 then typically provides the actuator 1614 with such control information.

The acoustic actuator 1614 acts upon a turbocharger 1620, and/or an upstream and/or downstream component or components thereof, typically in an effort to reduce and/or otherwise control acoustic noise. An actuate block typically acts through use of an actuator, such as, but not limited to, a piezoelectric actuator capable of generating one or more waveforms. In general, a waveform has characteristics that may reduce and/or cancel a source waveform that is responsible for noise and/or other deleterious vibration. In turn, an acoustic sensor 1618 senses vibration stemming from, for example, the turbocharger 1620. Further, as already mentioned, the acoustic sensor 1618 optionally links to one or more control junctions.

While actuators often produce optimal results when positioned proximate to a source of noise, as disclosed herein, actuators are optionally located at any of a variety of positions, some of which may be distant from the source. For example, an exemplary system and/or method include use of an actuator positioned proximate to an exhaust outlet, where exhaust discharges to the atmosphere. In this example, one or more active waveforms emitted by the actuator optionally travel toward the source(s). Yet other exemplary systems and/or methods include actuators positioned proximate to a person or persons (e.g., occupants of a vehicle).

Figure 17:
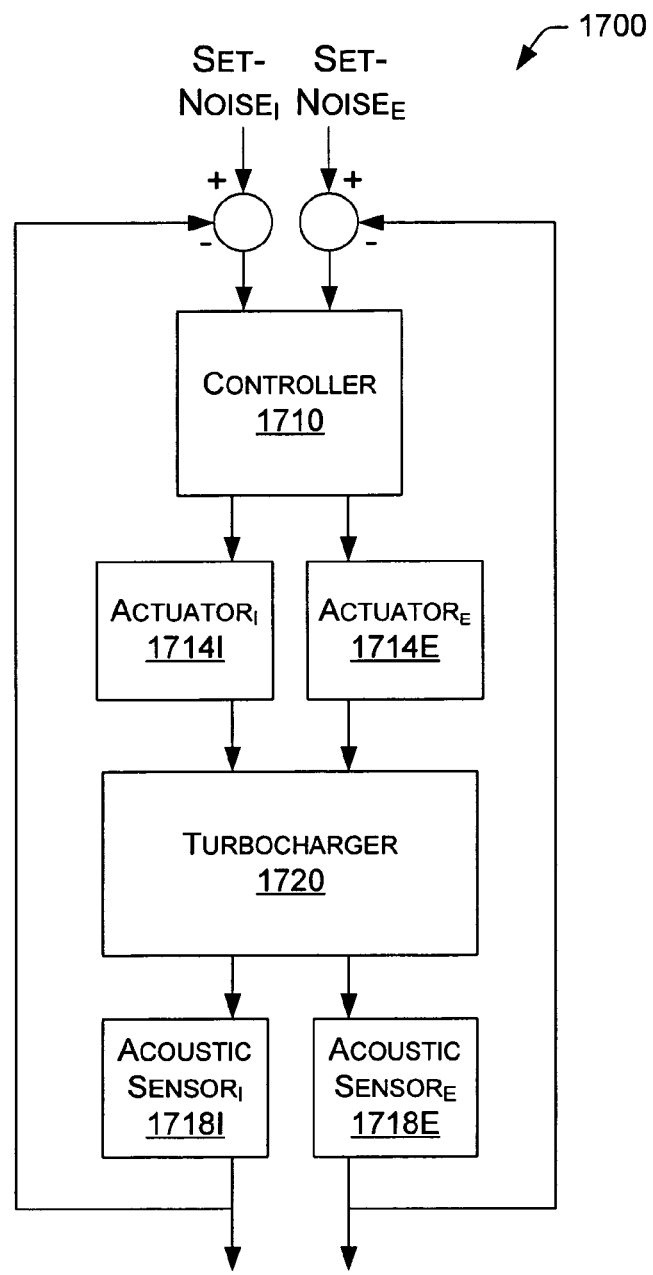
FIG. 17 is a block diagram illustrating an exemplary control system and/or method for acoustic noise having one or more intake actuators and/or sensors and/or one or more exhaust actuators and/or sensors.

Referring to FIG. 17, an exemplary system and/or method 1700 for noise control is shown. The exemplary system and/or method 1700 optionally operates in one or more closed-loops. As shown in FIG. 17, a set value for intake-side acoustic control (e.g., Set-Noise$_I$) and/or a set value for exhaust-side acoustic control (e.g., Set-Noise$_E$) are input to an intake-side control junction and an exhaust-side control junction, respectively. The intake-side control junction may also receive information (e.g., a signal, etc.) from an intake-side sensor block 1718I and the exhaust-side control junction may also receive information (e.g., a signal, etc.) from an exhaust-side sensor block 1718E. The intake-side control junction and the exhaust-side control junction link (e.g., via communication links, optionally including wireless links) to a controller 1710 whereby, the control junctions optionally provide information to the controller 1710. The controller 1710 uses control logic and/or the information from the control junctions and/or other component to generate actuator control information, wherein the actuator control information optionally includes control information for an intake-side actuator 1714I and/or control information for an exhaust-side actuator 1714E. The controller 1710 then typically provides the intake-side actuator 1714I and/or the exhaust-side actuator 1714E with such control information.

The intake-side actuator 1714I and the exhaust-side actuator 1714E act upon a turbocharger 1720, and/or an associated component thereof, (e.g., an intake, a compressor, a turbine, an exhaust, etc.), typically in an effort to reduce and/or otherwise control acoustic noise. An actuate block typically acts through use of an actuator, such as, but not limited to, a piezoelectric actuator capable of generating one or more waveforms. In general, a waveform has characteristics that may reduce and/or cancel a source waveform that is responsible for noise and/or other deleterious vibration. In tun, an intake-side acoustic sensor 1718I and/or an exhaust-side acoustic sensor 1718E sense noise stemming from, for example, the turbocharger 1720, and/or an associated component thereof. Further, as already mentioned, the intake-side acoustic sensor 1718I and/or the exhaust-side acoustic sensor 1718E optionally link to one or more control junctions (e.g., an intake-side control junction, an exhaust-side control junction, etc.).

Figure 18:
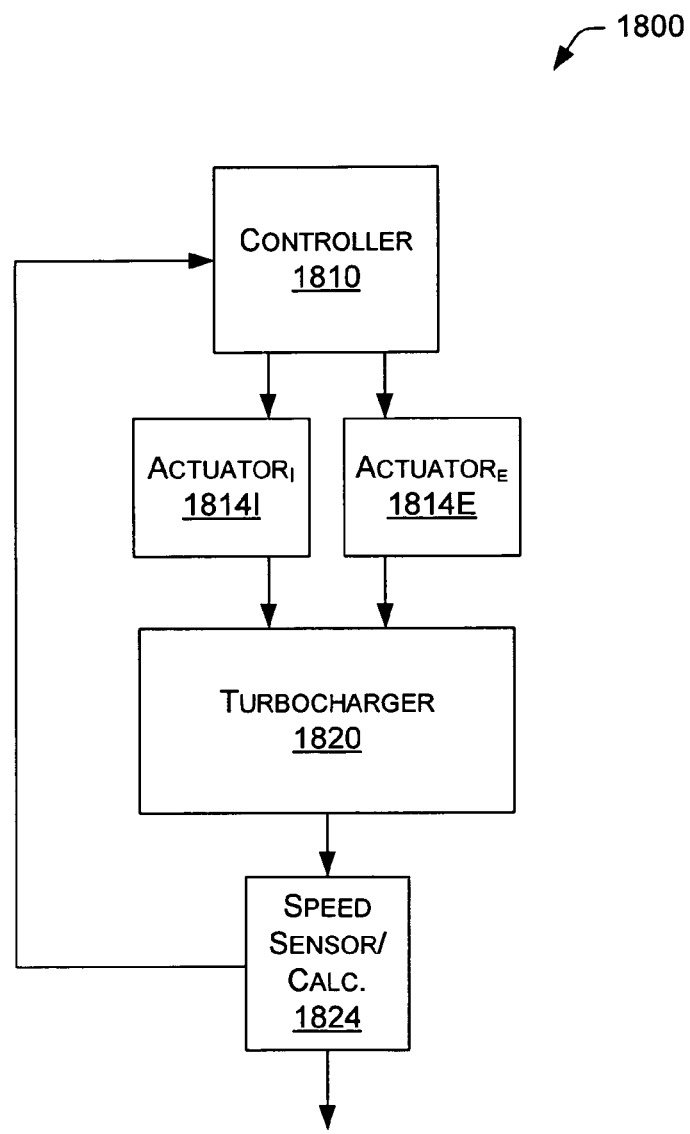
FIG. 18 is a block diagram illustrating an exemplary control system and/or method for acoustic noise having a speed sensor and/or speed determination block.

Referring to FIG. 18, an exemplary system and/or method 1800 for noise control is shown. A controller block 1810 uses control logic and/or information from a speed sensor block 1824, which optionally determines speed, and/or other component to generate actuator control information, wherein the actuator control information optionally includes control information for an intake-side actuator 1814I and/or control information for an exhaust-side actuator 1814E. The controller 1810 then typically provides the intake-side actuator 1814I and/or the exhaust-side actuator 1814E with such control information.

The intake-side actuator 18141 and the exhaust-side actuator 1814E act upon a turbocharger 1820, and/or component(s) associated therewith (e.g., an intake, a compressor, an exhaust, a turbine, etc.), typically in an effort to reduce and/or otherwise control noise. An actuate block typically acts through use of an actuator, such as, but not limited to, a piezoelectric actuator capable of generating one or more waveforms. In general, a waveform has characteristics that may reduce and/or cancel a source waveform that is responsible for noise and/or other deleterious vibration.

The speed sensor block 1824 typically senses and/or otherwise receives information related to speed of a shaft of the turbocharger 1820, which it optionally uses to determine speed and/or provide information to the controller 1810 and/or an engine control unit. An exemplary control system and/or method optionally knows a priori and/or learns acoustic characteristics of a turbocharger (e.g., and/or a compressor, a turbine, an intake, an exhaust, etc.) as a function of shaft rotational speed and/or some other parameter. According to such an exemplary system and/or method, acoustic noise control is responsive to shaft rotational speed and/or some other performance related parameter.

While actuators often produce optimal results when positioned proximate to a source of noise, as disclosed herein, actuators are optionally located at any of a variety of positions, some of which may be distant from the source. For example, an exemplary system and/or method include use of an actuator positioned proximate to an exhaust outlet, where exhaust discharges to the atmosphere. In this example, one or more active waveforms emitted by the actuator optionally travel toward the source(s). Yet other exemplary systems and/or methods include actuators positioned proximate to a person or persons (e.g., occupants of a vehicle).

Figure 19:
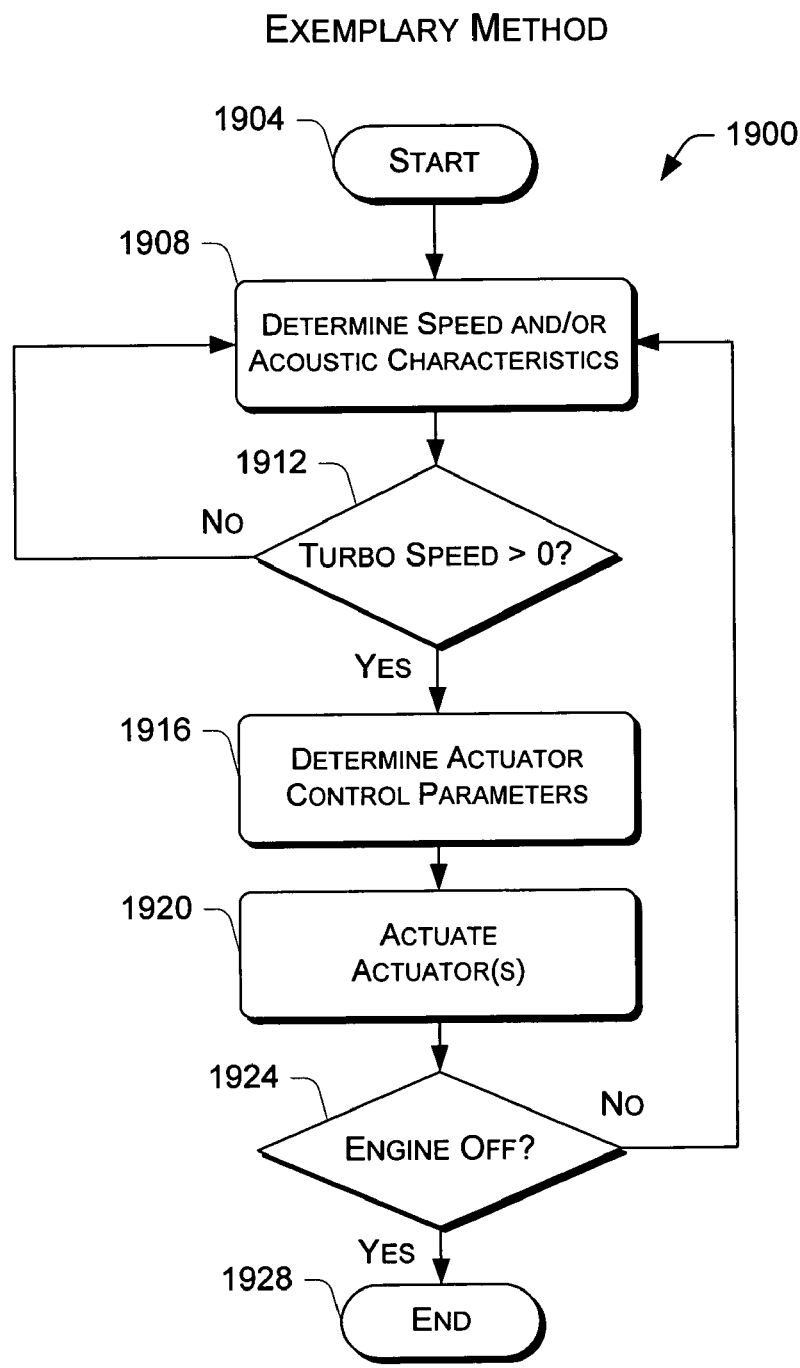
FIG. 19 is a block diagram of an exemplary method for controlling acoustic noise.
Figure 20:
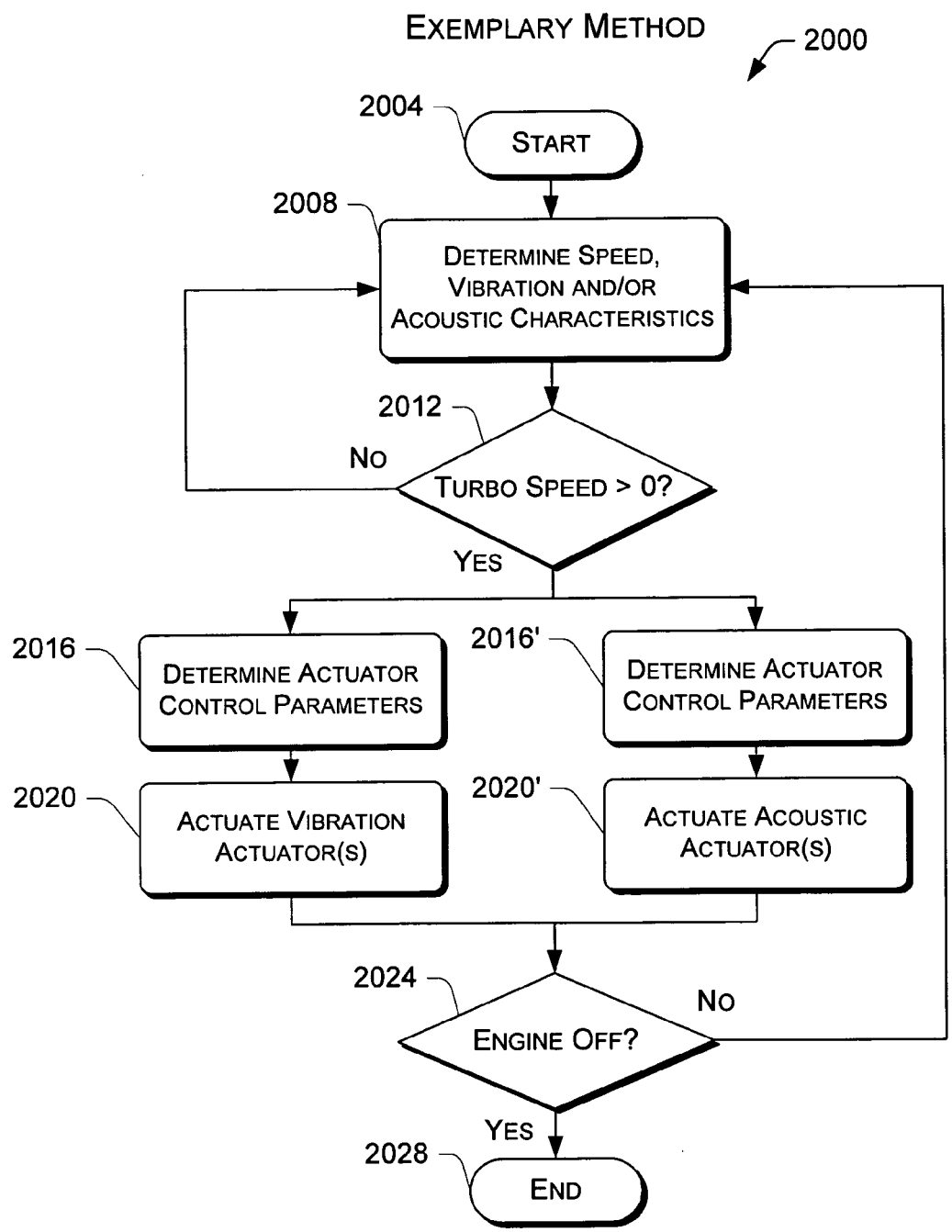
FIG. 20 is a block diagram illustrating an exemplary method for controlling vibration noise and/or acoustic noise.

Referring to FIG. 19, an exemplary method 1900 is shown. In a start block 1904, control commences. Next, in a determination block 1908, a controller and/or a sensor determines speed and/or acoustic characteristics. A check block 1912 follows wherein the controller determines if the speed of the turbocharger is greater than zero, or some other value. Of course, any of a variety of parameters other than speed is optionally used in a check block or other block to determine proper control, for example, to determine whether actuation of one or more active waveform actuators is a suitable control strategy to reduce noise. If the check block 1912 determines and/or otherwise indicates that the turbocharger shaft speed is zero, then the system and/or method continue at the determination block 1908. Alternatively, if the check block 1912 determines and/or otherwise indicates that the turbocharger shaft speed is greater than zero (or other value), then the system and/or method continues an actuator parameter determination block 1916. Alternatively, an adjustment block adjusts controller gain(s) typically associated with one or more sensors and/or actuators. Adjustment of sensor gain prior to determination of actuator parameters typically allows for more robust control. The actuator parameter determination block 1916 determines control parameters for one or more actuators. An actuation block 1920 uses such information to actuate one or more actuators, which, in turn, act upon the turbocharger (e.g., compressor, turbine, intake, exhaust, etc.) in an effort to reduce noise. Following the actuation block 1920, the system and/or method continues another check block 1924, which checks the "on/off" status of the engine. If the check block 1924 determines and/or otherwise indicates that the engine is "off", the exemplary method ends in an end block 1928. Otherwise, the exemplary method continues at the determination block 1908. While the exemplary control system and/or method is optionally used in a "cool down" period, the control system and/or method typically halt operation once the engine is shut off.

An exemplary control system and/or method for controlling vibration and/or acoustic noise commences in a start block. Next, in a characteristics determination block, a controller and/or a sensor determine speed, vibration and/or acoustic characteristics. A check block follows wherein the controller determines if the speed of the turbocharger is greater than zero, or some other value. Of course, any of a variety of parameters other than speed is optionally used in a check block or other block to determine proper control, for example, to determine whether actuation of one or more active waveform actuators is a suitable control strategy to reduce noise. If the check block determines and/or otherwise indicates that the turbocharger shaft speed is zero, then the system and/or method continue at the characteristics determination block. Alternatively, if the check block determines and/or otherwise indicates that the turbocharger shaft speed is greater than zero (or other value), then the system and/or method continues in one or more actuator parameter determination blocks. Alternatively, an adjustment block adjusts gain(s) typically associated with one or more sensors and/or actuators. Adjustment of sensor gain prior to determination of actuator parameters in one or more actuator parameter determination blocks typically allows for more robust control. The one or more actuator parameter determination blocks determine control parameters for one or more actuators. For example, one actuator parameter determination block determines parameters for one or more vibration noise reduction actuators and another actuator parameter determination block determines parameters for one or more acoustic noise reduction actuators. Actuation of one or more actuators occurs in respective actuation blocks. Following the actuation blocks, the system and/or method continues in another check block, which checks the "on/off" status of the engine. If the check block determines and/or otherwise indicates that the engine is "off", the exemplary method ends in an end block. Otherwise, the exemplary method continues at the characteristics determination block. While the exemplary control system and/or method is optionally used in a "cool down" period, the control system and/or method typically halt operation once the engine is shut off.

Although some exemplary methods, devices and systems have been illustrated in the accompanying Drawings and described in the foregoing Detailed Description, it will be understood that the methods and systems are not limited to the exemplary embodiments disclosed, but are capable of numerous rearrangements, modifications and substitutions without departing from the scope set forth and defined by the following claims.

What is claimed is:

1. A method of reducing noise, the method comprising:
   sensing noise in an exhaust of an internal combustion engine wherein the sensing noise occurs downstream from a rotating, exhaust driven turbine;
   sensing or determining rotating speed of the rotating turbine;
   determining one or more actuator control parameters based on information wherein the information comprises information acquired by the sensing noise and information acquired by the sensing or determining rotating speed; and
   actuating one or more actuators using the one or more actuator control parameters to reduce the noise, wherein the noise includes noise stemming from a turbocharger.

2. The method of claim 1, wherein a known relationship exists between rotating speed of the turbine and noise generated by the turbine.

3. The method of claim 1, further comprising sensing noise in a combustion gas intake.

4. One or more computer-readable media having computer-readable instructions thereon which, when executed by a programmable device, perform the method of claim 1.

5. A system for reducing noise, the system comprising:
   sensor means for sensing noise in an exhaust of an internal combustion engine wherein the sensing noise occurs downstream from a rotating, exhaust driven turbine;
   sensor or determination means for sensing or determining rotating speed of the rotating turbine;
   determination means for determining one or more actuator control parameters based on information wherein the information comprises information acquired by the sensor means for sensing noise and information acquired by the sensor or determination means for sensing or determining rotating speed; and
   actuation means for actuating one or more actuators using the one or more actuator control parameters to reduce the noise, wherein the noise includes noise stemming from a turbocharger.

6. The system of claim 5, wherein the sensor means includes one or more sensors configured to sense pressure waveforms.

7. The system of claim 5, wherein the determination means includes a processor configured to determine one or more actuator control parameter.

8. The system of claim 5, wherein the actuation means includes one or more actuators configured to generate pressure waveforms.

9. A system configured to reduce noise, the system comprising:
- one or more sensors configured to sense noise in an exhaust of an internal combustion engine wherein the one or more sensors sense noise downstream from an exhaust driven turbine having a rotation speed;
- a processor operatively coupled to receive information from the one or more sensors and to receive the rotation speed and configured to determine one or more actuator control parameters based on information wherein the information comprises information received from the more or more sensors and the rotation speed; and
- one or more actuators operatively coupled to receive the one or more actuator control parameters from the processor and configured to generate waveforms based at least in part on the one or more actuator control parameters, wherein the noise includes noise stemming from a turbocharger.

10. A device comprising:
a controller, the controller configured to receive information from one or more sensors, the information pertaining to noise sensed in an exhaust of an internal combustion engine, the noise sensed downstream from an exhaust driven turbine, the turbine having a rotation speed and the noise including noise stemming from a turbocharger; the controller further configured to determine one or more actuator control parameters based on information that comprises the information pertaining to noise and the rotation speed; and the controller yet further configured to transmit the one or more actuator control parameters to one or more actuators.

* * * * *